United States Patent
Chen et al.

(10) Patent No.: US 11,777,587 B2
(45) Date of Patent: Oct. 3, 2023

(54) RESOURCE CONFIGURATION METHOD, APPARATUS, AND SYSTEM

(71) Applicant: HUAWEI TECHNOLOGIES CO., LTD., Guangdong (CN)

(72) Inventors: Lei Chen, Chengdu (CN); Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/103,268

(22) Filed: Nov. 24, 2020

(65) Prior Publication Data
US 2021/0083751 A1 Mar. 18, 2021

Related U.S. Application Data

(63) Continuation of application No. PCT/CN2019/088686, filed on May 28, 2019.

(30) Foreign Application Priority Data

May 28, 2018 (CN) .......................... 201810525115.0

(51) Int. Cl.
 *H04B 7/08* (2006.01)
 *H04W 72/0446* (2023.01)
 (Continued)

(52) U.S. Cl.
 CPC .......... *H04B 7/088* (2013.01); *H04L 5/0051* (2013.01); *H04L 25/0226* (2013.01);
 (Continued)

(58) Field of Classification Search
CPC ... H04B 7/088; H04L 5/0051; H04L 25/0226; H04W 24/10; H04W 72/0413; H04W 72/0446; H04W 72/0453; H04W 76/19
See application file for complete search history.

(56) References Cited

U.S. PATENT DOCUMENTS

| | | | |
|---|---|---|---|
| 5,109,487 | A | 4/1992 | Ohgomori et al. |
| 2016/0353510 | A1 | 12/2016 | Zhang et al. |

(Continued)

FOREIGN PATENT DOCUMENTS

| | | |
|---|---|---|
| CN | 102541761 A | 7/2012 |
| CN | 103634037 A | 3/2014 |

(Continued)

OTHER PUBLICATIONS

3GPP TS 38.213 V15.1.0 (Mar. 2018), "3rd Generation Partnership Project; Technical Specification Group Radio Access Network; NR; Physical layer procedures for control (Release 15)," Mar. 2018, 77 pages.

(Continued)

*Primary Examiner* — Brian P Cox
(74) *Attorney, Agent, or Firm* — Fish & Richardson P.C.

(57) ABSTRACT

Embodiments of this application disclose a resource configuration method, apparatus, and system. A network device sends a resource configuration of a physical uplink control channel PUCCH used for beam failure recovery to a terminal device, where the resource configuration of the PUCCH includes a corresponding transmit beam of the PUCCH. When detecting a beam failure event, the terminal device sends a transmit beam failure recovery request to the network device based on the resource configuration of the PUCCH and a corresponding periodicity of the PUCCH. The periodicity of the PUCCH may be configured by the network device, or may be a preset periodicity. According to the configuration manner of the PUCCH resource used for beam failure recovery in the embodiments of this application, the terminal device can flexibly and effectively perform beam failure recovery.

25 Claims, 8 Drawing Sheets

(51) Int. Cl.
  *H04W 72/0453* (2023.01)
  *H04W 72/21* (2023.01)
  *H04W 76/19* (2018.01)
  *H04L 5/00* (2006.01)
  *H04L 25/02* (2006.01)
  *H04W 24/10* (2009.01)

(52) U.S. Cl.
  CPC ....... *H04W 24/10* (2013.01); *H04W 72/0446* (2013.01); *H04W 72/0453* (2013.01); *H04W 72/21* (2023.01); *H04W 76/19* (2018.02)

(56) References Cited

U.S. PATENT DOCUMENTS

2020/0358577 A1* 11/2020 Takeda .................. H04L 5/0042
2021/0058998 A1* 2/2021 Yuan ..................... H04W 24/08

FOREIGN PATENT DOCUMENTS

| CN | 107079459 A | 8/2017 |
|----|-------------|--------|
| CN | 107948987 A | 4/2018 |
| CN | 108024365 A | 5/2018 |
| RU | 2516237 C2 | 5/2014 |
| RU | 2599619 C1 | 10/2016 |
| WO | 2015002466 A2 | 1/2015 |
| WO | 2019124983 A1 | 6/2019 |

OTHER PUBLICATIONS

3GPP TS 38.214 V15.1.0 (Mar. 2018), "3rd Generation Partnership Project; Technical Specification Group Radio Access Network; NR; Physical layer procedures for data (Release 15)," Mar. 2018, 77 pages.

3GPP TS 38.321 V15.1.0 (Mar. 2018), "3rd Generation Partnership Project; Technical Specification Group Radio Access Network; NR; Medium Access Control (MAC) protocol specification (Release 15)," Mar. 2018, 67 pages.

3GPP TS 38.331 V15.1.0 (Mar. 2018), "3rd Generation Partnership Project; Technical Specification Group Radio Access Network; NR; Radio Resource Control (RRC) protocol specification Release 15)," Mar. 2018, 268 pages.

NTT DOCOMO, Inc, "Status Report to TSG,"3GPP TSG RAN meeting #76, RP-171137, West Palm Beach, USA, Jun. 5-8, 2017, 218 pages.

PCT International Search Report and Written Opinion issued in International Application No. PCT/CN2019/088686 dated Sep. 3, 2019, 15 pages (with English translation).

Office Action issued in Indian Application No. 202047053399 dated Dec. 14, 2021, 6 pages.

Asustek, "Discussion on PUCCH beam failure recovery request in NR," 3GPP TSG-RAN WG2 Meeting #102, R2-1806916, Busan, Korea, May 21-25, 2018, 3 pages.

Ericsson, "Text proposal on priority rules for PUCCH carrying RSRP reports and SRS," 3GPP TSG RAN WG1 Meeting AH 1801, R1-1801230, Vancouver, Canada, Jan. 22-26, 2018, 1 page.

Extended European Search Report issued in European Application No. 19811525.5 dated Jun. 16, 2021, 11 pages.

Nec, "Remaining issues on beam failure recovery," 3GPP TSG RAN WG1 Meeting #92b, R1-1803622, Sanya, China, Apr. 16-20, 2018, 2 pages.

ZTE, Sanechips, "Remaining details on beam recovery," 3GPP TSG RAN WG1 Meeting #92, R1-1801582, Athens, Greece, Feb. 26-Mar. 2, 2018, 6 pages.

Huawei, HiSilicon, "Summary of RS multiplexing," 3GPP TSG RAN WG1 Meeting AH NR#3, R1-1716725, Nagoya, Japan, Sep. 18-21, 2017, 5 pages.

Office Action issued in Chinese Application No. 201810525115.0 dated Jul. 29, 2022, 8 pages.

ZTE, "Discussion on mechanism to recovery from beam failure," 3GPP TSG RAN WG1 Meeting #90, R1-1712300, Prague, Czechia, Aug. 21-25, 2017, 9 pages.

Office Action issued in Russian Application No. 2020142671/07(079429) dated Apr. 4, 2022, 20 pages (with English translation).

\* cited by examiner

RESOURCE CONFIGURATION METHOD, APPARATUS, AND SYSTEM

CROSS-REFERENCE TO RELATED APPLICATIONS

This application is a continuation of International Application No. PCT/CN2019/088686, filed on May 28, 2019, which claims priority to Chinese Patent Application No. 201810525115.0, filed on May 28, 2018. The disclosures of the aforementioned applications are hereby incorporated by reference in their entireties.

TECHNICAL FIELD

This application relates to the field of communications technologies, and in particular, to a beam-based communication technology in a communications system, and specifically, to a resource configuration method, apparatus, and system in the communications system.

BACKGROUND

In a mobile communications system, transmission by using a beam, to be specific, sending a signal in a specific direction in space, can obtain a higher antenna array gain. The beam may be implemented by using a technology such as beamforming (Beamforming). For example, an important area in high frequency (high frequency, HF) communication is analog and digital hybrid beamforming (hybrid Beamforming). This can well combat loss of a high frequency signal caused by a transmission distance, and control complexity and hardware costs to be within an acceptable level.

In a beam-based communications system, a transmitting side centrally transmits signals in a specific direction to obtain a beam gain, and a receiving side adjusts a beam receiving mode to obtain more signal energy. However, due to movement, blocking, or a change of a channel interference environment, communication quality of a pair of transmit and receive beams that are in communication may deteriorate, or even communication cannot be performed normally. To avoid a beam failure caused by deterioration of beam communication quality, user equipment (User Equipment, UE for short) needs to detect a beam. When a physical layer of the UE determines, within a beam detection interval (which may correspond to a reporting periodicity), that a detected beam does not meet a predetermined condition, a beam failure instance is generated, and the beam failure instance is reported to a higher layer of the UE at the reporting periodicity. When detected beams continuously do not meet the predetermined condition (that is, beam failure instances are continuously generated), the UE may determine that a beam failure occurs, and enter a beam recovery procedure. The beam recovery procedure includes steps such as identification of a new beam in a candidate beam set, a request of beam failure recovery, and receiving of a beam failure response.

For the beam recovery procedure, beam recovery is currently performed on a physical random access channel (physical random access channel, PRACH for short) resource, and a shortest periodicity of the PRACH resource is 10 ms. For a system (for example, a delay-sensitive system) having a requirement for fast beam recovery, beam recovery based on the PRACH resource takes an excessively long time. In addition, a PRACH resource configuration is not flexible enough. On some bandwidth parts (bandwidth part, BWP for short) or component carriers (Component Carrier, CC for short), a network device may not configure a PRACH resource. In comparison, a physical uplink control channel (physical uplink control channel, PUCCH for short) resource has higher flexibility. However, because a receive beam and a transmit beam of the PUCCH are determined in a normal case, if the PUCCH resource is used for beam recovery, an uplink beam of the PUCCH may fail to be used for communication when a beam failure occurs, and consequently it cannot be ensured that a base station can successfully receive a beam failure recovery request.

SUMMARY

This application provides a resource configuration method, apparatus, and system, to perform beam recovery configuration by using flexibility of a PUCCH resource, so that beam recovery can be flexibly and effectively implemented.

According to a first aspect, a resource configuration method and apparatus are provided.

In a possible design, the method is applied to a terminal device, and a network side sends configuration information of a PUCCH resource used for beam failure recovery to a terminal side, so that the terminal device can flexibly and effectively perform beam failure recovery. The method includes: receiving a resource configuration that is of a physical uplink control channel PUCCH used for beam failure recovery and that is sent by a network device, where the resource configuration of the PUCCH includes a corresponding transmit beam of the PUCCH; and when a beam failure event is detected, sending a beam failure recovery request to the network device based on the resource configuration of the PUCCH and a corresponding periodicity of the PUCCH. It can be understood that the periodicity of the PUCCH may be configured by the network device. In other words, the resource configuration of the PUCCH includes the periodicity of the PUCCH, or the periodicity of the PUCCH may be a preset periodicity, that is, the periodicity of the PUCCH is predefined in a protocol, a specification, or the like. It should be noted that, if a base station configures uplink transmission or an uplink transmission resource with a periodicity property, for example, transmission of a periodic or semi-persistent uplink sounding signal, transmission of a periodic or semi-persistent scheduling request, transmission of periodic or semi-persistent data, reporting of a periodic or semi-persistent downlink reference signal, or a periodic or semi-persistent random access resource, some or all of periodicities of the foregoing uplink transmission or a periodicity of the uplink transmission resource may also be reused as the periodicity of the PUCCH.

In this design, the PUCCH resource used for beam failure recovery is configured, so that the terminal device can flexibly and effectively perform beam failure recovery.

Correspondingly, a resource configuration apparatus is provided. The apparatus can implement the corresponding method in the first aspect. For example, the apparatus is limited in a functional form, and may be an entity on a terminal side. A specific implementation of the apparatus may be a terminal device. For example, the apparatus may be a terminal device, or a chip or a functional module in a terminal device. The method may be implemented by software or hardware, or by executing corresponding software by hardware.

In a possible design, the apparatus may include a processor and a memory. The processor is configured to support the apparatus in performing a corresponding function in the method according to the first aspect. The memory is configured to couple to the processor, and stores a program (instruction) and data that are necessary for the apparatus. In addition, the apparatus may further include a communications interface, configured to support the apparatus in communicating with another network element. The communications interface may be a transceiver.

In a possible design, the apparatus may include a transceiver unit. The transceiver unit is configured to communicate with a network device to receive the resource configuration of the PUCCH. The apparatus may further include a processing unit. The processing unit is configured to determine that a beam failure event is detected.

According to a second aspect, a resource configuration method and apparatus are provided.

In a possible design, the method is applied to a network device, for example, an access node, or a transmission reception point having some functions of an access node on a network side. A network side sends configuration information of a PUCCH resource used for beam failure recovery to a terminal side, so that the terminal device can flexibly and effectively perform beam failure recovery. The method includes: sending a resource configuration of a physical uplink control channel PUCCH used for beam failure recovery to a terminal device, where the resource configuration of the PUCCH includes a corresponding transmit beam of the PUCCH; and receiving a beam failure recovery request that is sent when the terminal device detects a beam failure event and based on the resource configuration of the PUCCH and a corresponding periodicity of the PUCCH. It can be understood that the periodicity of the PUCCH may be configured by the network device. In other words, the resource configuration of the PUCCH includes the periodicity of the PUCCH, or the periodicity of the PUCCH may be a preset periodicity, that is, the periodicity of the PUCCH is predefined in a protocol, a specification, or the like. It should be noted that, if a base station configures uplink transmission or an uplink transmission resource with a periodicity property, for example, transmission of a periodic or semi-persistent uplink sounding signal, transmission of a periodic or semi-persistent scheduling request, transmission of periodic or semi-persistent data, reporting of a periodic or semi-persistent downlink reference signal, or a periodic or semi-persistent random access resource, some or all of periodicities of the foregoing uplink transmission or a periodicity of the uplink transmission resource may also be reused as the periodicity of the PUCCH.

In this design, the PUCCH resource used for beam failure recovery is configured, so that the terminal device can flexibly and effectively perform beam failure recovery.

Correspondingly, a resource configuration apparatus is provided. The apparatus can implement the corresponding method in the second aspect. For example, the apparatus is limited in a functional form, and may be an entity on an access side. A specific implementation of the apparatus may be an access node device. For example, the apparatus may be an access node device, or may be a chip or a functional module in an access node device. The method may be implemented by software or hardware, or by executing corresponding software by hardware.

In a possible design, the apparatus may include a processor and a memory. The processor is configured to support the apparatus in performing a corresponding function in the method according to the second aspect. The memory is configured to couple to the processor, and stores a program (instruction) and data that are necessary for the apparatus. In addition, the apparatus may further include a communications interface, configured to support the apparatus in communicating with another network element. The communications interface may be a transceiver.

In a possible design, the apparatus may include a transceiver unit. The transceiver unit is configured to send the resource configuration of the PUCCH to a terminal device. The apparatus may further include a processing unit. The processing unit is configured to determine the resource configuration of the PUCCH configured for the terminal device.

Based on any one of the technical solutions provided in the first aspect and the second aspect:

In a possible design, the resource configuration of the PUCCH includes one PUCCH communication resource or a plurality of PUCCH communication resources.

In a possible design, the resource configuration of the PUCCH further includes at least one of the following: a communication resource (for example, a time-frequency code domain resource) of the PUCCH, a time offset of the PUCCH, and a format of the PUCCH.

In a possible design, the resource configuration of the PUCCH further includes: an association relationship between a use time of the transmit beam and the periodicity of the PUCCH, and/or an association relationship between the use time of the transmit beam and a time offset of the PUCCH.

In a possible design, the resource configuration of the PUCCH is associated with resources of downlink signals corresponding to candidate beams in a candidate beam set, and the candidate beam set is a beam set used for beam failure recovery and configured by the network device; and/or the resource configuration of the PUCCH is associated with one or more resources of an uplink signal/uplink signals. It may be understood that, for the foregoing two association cases, when the resource configuration of the PUCCH includes one PUCCH communication resource (for example, a time-frequency code domain resource), the time-frequency resource configuration of the PUCCH is associated with the resources of the downlink signals corresponding to the candidate beams in the candidate beam set; or the time-frequency resource configuration of the PUCCH is associated with the one or more resources of an uplink signal or uplink signals. It may be further understood that, when the resource configuration of the PUCCH includes at least two PUCCH communication resources (for example, time-frequency code domain resources), there may be two cases: In one case, each PUCCH communication resource is one-to-one associated with one resource of a downlink signal corresponding to a candidate beam in the candidate beam set, or each PUCCH communication resource is one-to-one associated with one resource of an uplink signal. In the other case, some PUCCH communication resources are one-to-one associated with the resources of the downlink signals corresponding to the candidate beams or one-to-one associated with the resources of the uplink signals, and some PUCCH communication resources are one-to-many associated with the resources of the downlink signals corresponding to candidate beams or one-to-many associated with the resources of the uplink signals. A one-to-many dedicated PUCCH resource used for beam failure recovery is configured, so that the terminal device can flexibly and effectively perform beam failure recovery, thereby reducing resource occupation and overheads. Further, the transmit beam includes uplink transmit beams corresponding to the candidate beams that are in the candidate beam set and that are used to transmit the downlink signals; and/or the transmit beam includes beams used to transmit the uplink signals.

In a possible design, the resource configuration of the PUCCH includes a time-frequency resource of the PUCCH; and the time-frequency resource of the PUCCH is the same as a time-frequency resource of an uplink measurement signal; or a time domain resource of the PUCCH is the same as a time domain resource of an uplink measurement signal, and a frequency domain resource of the PUCCH is different from a frequency domain resource of the uplink measurement signal. It may be understood that, considering that the network device configures periodic uplink measurement signal resources for the terminal device, the network device originally receives uplink measurement signals on these uplink measurement signal resources, and therefore, these uplink measurement signal resources may be considered to be reused as PUCCH resources. When the time-frequency resource of the PUCCH is the same as a time-frequency resource of an uplink measurement signal, optionally, transmission of the PUCCH may preempt the resource for transmission of the uplink measurement signal, and optionally, may not preferentially preempt the resource for transmission of the uplink measurement signal. The terminal device may determine, based on a priority configured by the network device or a predefined priority, whether transmission of the PUCCH preempts the resource for transmission of the uplink measurement signal. Further, the transmit beam includes uplink transmit beams corresponding to candidate beams that are in a candidate beam set and that are used to transmit downlink signals, and/or includes a beam for transmitting the uplink measurement signal; and the candidate beam set is a beam set used for beam failure recovery and configured by the network device.

In a possible design, the transmit beam includes a beam for transmitting an uplink measurement signal, the terminal device sends beam information to the network device when the terminal device uses a transmit beam other than the transmit beam in beams for transmitting uplink measurement signals to send a beam failure recovery request to the network device, and the network device receives the beam information sent by the terminal device, where the beam information is used to indicate the beam for sending the beam failure recovery request.

According to a third aspect, a resource configuration method and apparatus are provided.

In a possible design, the method is applied to a terminal device, and a network side sends configuration information of a PUCCH resource used for beam failure recovery to a terminal side, so that the terminal device can flexibly and effectively perform beam failure recovery. The method includes: receiving a resource configuration that is of a physical uplink control channel PUCCH used for beam failure recovery and that is sent by a network device, where the resource configuration of the PUCCH includes a corresponding transmit beam of the PUCCH; and when it is detected that a direction of the transmit beam of the PUCCH changes, determining a new transmit beam of the PUCCH, where the new transmit beam of the PUCCH is a beam whose direction is the same as a direction of the transmit beam of the PUCCH before the direction of the transmit beam of the PUCCH changes and that is in uplink transmit beams, and sending information about the new transmit beam of the PUCCH to the network device.

In this design, the PUCCH resource used for beam failure recovery is configured, so that the terminal device can flexibly and effectively perform beam failure recovery, and when a direction of a transmit beam of the PUCCH changes due to rotation of the terminal device or the like, transmission of the PUCCH used for beam failure recovery can be ensured.

Correspondingly, a resource configuration apparatus is provided. The apparatus can implement the corresponding method in the third aspect. For example, the apparatus is limited in a functional form, and may be an entity on a terminal side. A specific implementation of the apparatus may be a terminal device. For example, the apparatus may be a terminal device, or a chip or a functional module in a terminal device. The method may be implemented by software or hardware, or by executing corresponding software by hardware.

In a possible design, the apparatus may include a processor and a memory. The processor is configured to support the apparatus in performing a corresponding function in the method according to the third aspect. The memory is configured to couple to the processor, and stores a program (instruction) and data that are necessary for the apparatus. In addition, the apparatus may further include a communications interface, configured to support the apparatus in communicating with another network element. The communications interface may be a transceiver.

In a possible design, the apparatus may include a transceiver unit. The transceiver unit is configured to communicate with a network device to receive the resource configuration of the PUCCH. The apparatus may further include a processing unit. The processing unit is configured to: determine that a direction of a transmit beam of a PUCCH changes, and determine a new transmit beam of the PUCCH.

According to a fourth aspect, a resource configuration method and apparatus are provided.

In a possible design, the method is applied to a network device, for example, an access node, or a transmission reception point having some functions of an access node on a network side. A network side sends configuration information of a PUCCH resource used for beam failure recovery to a terminal side, so that the terminal device can flexibly and effectively perform beam failure recovery. The method includes: sending a resource configuration of a physical uplink control channel PUCCH used for beam failure recovery to a terminal device, where the resource configuration of the PUCCH includes a corresponding transmit beam of the PUCCH; and receiving information that is about a new transmit beam of the PUCCH and that is sent by the terminal device, where the new transmit beam of the PUCCH is a new transmit beam that is of the PUCCH and that is determined when the terminal detects that a direction of the transmit beam of the PUCCH changes, and the new transmit beam of the PUCCH is a beam whose direction is the same as the direction of the transmit beam of the PUCCH before the direction of the transmit beam changes and that is in uplink transmit beams.

In this design, the PUCCH resource used for beam failure recovery is configured, so that the terminal device can flexibly and effectively perform beam failure recovery, and when a direction of a transmit beam of the PUCCH changes due to rotation of the terminal device or the like, transmission of the PUCCH used for beam failure recovery can be ensured.

Correspondingly, a resource configuration apparatus is provided. The apparatus can implement the corresponding method in the fourth aspect. For example, the apparatus is limited in a functional form, and may be an entity on an access side. A specific implementation of the apparatus may be an access node device. For example, the apparatus may be an access node device, or may be a chip or a functional module in an access node device. The method may be implemented by software or hardware, or by executing corresponding software by hardware.

In a possible design, the apparatus may include a processor and a memory. The processor is configured to support the apparatus in performing a corresponding function in the method according to the fourth aspect. The memory is configured to couple to the processor, and stores a program (instruction) and data that are necessary for the apparatus. In addition, the apparatus may further include a communications interface, configured to support the apparatus in communicating with another network element. The communications interface may be a transceiver.

In a possible design, the apparatus may include a transceiver unit. The transceiver unit is configured to send the resource configuration of the PUCCH to a terminal device. The apparatus may further include a processing unit. The processing unit is configured to determine a PUCCH resource configured for the terminal device.

Based on the technical solutions provided in the third aspect and the fourth aspect:

In a possible design, the PUCCH resource further includes at least one of the following: a time-frequency code domain resource of the PUCCH, a time offset of the PUCCH, and a format of the PUCCH.

In a possible design, the PUCCH resource further includes: an association relationship between a use time of the transmit beam and the periodicity of the PUCCH, and/or an association relationship between the use time of the transmit beam and a time offset of the PUCCH.

In a possible design, the PUCCH resource is associated with resources of downlink signals corresponding to candidate beams in a candidate beam set, and the candidate beam set is a beam set used for beam failure recovery and configured by the network device; or the PUCCH resource is associated with one or more resources of an uplink signal/uplink signals.

According to a fifth aspect, a resource configuration method and apparatus are provided.

In a possible design, the method is applied to a terminal device, and a network side sends configuration information of a PUCCH resource used for beam failure recovery to a terminal side, so that the terminal device can flexibly and effectively perform beam failure recovery. The method includes: receiving a resource configuration that is of a physical uplink control channel PUCCH used for beam failure recovery and that is sent by a network device, where the resource configuration of the PUCCH includes an association relationship between a use time of a transmit beam of the PUCCH and a periodicity of the PUCCH, and/or an association relationship between the use time of the transmit beam and a time offset of the PUCCH; and when a beam failure event is detected, sending a beam failure recovery request to the network device based on the resource configuration of the PUCCH and the corresponding periodicity of the PUCCH. It can be understood that the periodicity of the PUCCH may be configured by the network device. In other words, the resource configuration of the PUCCH includes the periodicity of the PUCCH, or the periodicity of the PUCCH may be a preset periodicity, that is, the periodicity of the PUCCH is predefined in a protocol, a specification, or the like. It should be noted that, if a base station configures uplink transmission or an uplink transmission resource with a periodicity property, for example, transmission of a periodic or semi-persistent uplink sounding signal, transmission of a periodic or semi-persistent scheduling request, transmission of a periodic or semi-persistent data, reporting of a periodic or semi-persistent downlink reference signal, or a periodic or semi-persistent random access resource, some or all of periodicities of the foregoing uplink transmission or a periodicity of the uplink transmission resource may also be reused as the periodicity of the PUCCH.

In this design, the PUCCH resource used for beam failure recovery is configured, so that the terminal device can flexibly and effectively perform beam failure recovery.

Correspondingly, a resource configuration apparatus is provided. The apparatus can implement the corresponding method in the fifth aspect. For example, the apparatus is limited in a functional form, and may be an entity on a terminal side. A specific implementation of the apparatus may be a terminal device. For example, the apparatus may be a terminal device, or a chip or a functional module in a terminal device. The method may be implemented by software or hardware, or by executing corresponding software by hardware.

In a possible design, the apparatus may include a processor and a memory. The processor is configured to support the apparatus in performing a corresponding function in the method according to the fifth aspect. The memory is configured to couple to the processor, and stores a program (instruction) and data that are necessary for the apparatus. In addition, the apparatus may further include a communications interface, configured to support the apparatus in communicating with another network element. The communications interface may be a transceiver.

In a possible design, the apparatus may include a transceiver unit. The transceiver unit is configured to communicate with a network device to receive the resource configuration of the PUCCH. The apparatus may further include a processing unit. The processing unit is configured to determine that a beam failure event is detected.

According to a sixth aspect, a resource configuration method and apparatus are provided.

In a possible design, the method is applied to a network device, for example, an access node, or a transmission reception point having some functions of an access node on a network side. A network side sends configuration information of a PUCCH resource used for beam failure recovery to a terminal side, so that the terminal device can flexibly and effectively perform beam failure recovery. The method includes: sending a resource configuration of a physical uplink control channel PUCCH used for beam failure recovery to a terminal device, where the resource configuration of the PUCCH includes an association relationship between a use time of a transmit beam of the PUCCH and a periodicity of the PUCCH, and/or an association relationship between the use time of the transmit beam and a time offset of the PUCCH; and receiving a beam failure recovery request that is sent when the terminal device detects a beam failure event and based on the resource configuration of the PUCCH and a corresponding periodicity of the PUCCH. It can be understood that the periodicity of the PUCCH may be configured by the network device. In other words, the resource configuration of the PUCCH includes the periodicity of the PUCCH, or the periodicity of the PUCCH may be a preset periodicity, that is, the periodicity of the PUCCH is predefined in a protocol, a specification, or the like. It should be noted that, if a base station configures uplink transmission or an uplink transmission resource with a periodicity property, for example, transmission of a periodic or semi-persistent uplink sounding signal, transmission of a periodic or semi-persistent scheduling request, transmission of periodic or semi-persistent data, reporting of a periodic or semi-persistent downlink reference signal, or a periodic or semi-persistent random access resource, some or all of periodicities of the foregoing uplink transmission or a periodicity of the uplink transmission resource may also be reused as the periodicity of the PUCCH.

In this design, the PUCCH resource used for beam failure recovery is configured, so that the terminal device can flexibly and effectively perform beam failure recovery.

Correspondingly, a resource configuration apparatus is provided. The apparatus can implement the corresponding method in the sixth aspect. For example, the apparatus is limited in a functional form, and may be an entity on an access side. A specific implementation of the apparatus may be an access node device. For example, the apparatus may be an access node device, or may be a chip or a functional module in an access node device. The method may be implemented by software or hardware, or by executing corresponding software by hardware.

In a possible design, the apparatus may include a processor and a memory. The processor is configured to support the apparatus in performing a corresponding function in the method according to the sixth aspect. The memory is configured to couple to the processor, and stores a program (instruction) and data that are necessary for the apparatus. In addition, the apparatus may further include a communications interface, configured to support the apparatus in communicating with another network element. The communications interface may be a transceiver.

In a possible design, the apparatus may include a transceiver unit. The transceiver unit is configured to send the resource configuration of the PUCCH to a terminal device. The apparatus may further include a processing unit. The processing unit is configured to determine a PUCCH resource configured for the terminal device.

It should be noted that, based on the technical solution provided in any one of the first aspect, the second aspect, the fifth aspect, and the sixth aspect, when detecting a beam failure event, the terminal device sends a beam failure recovery request based on a resource configuration of the PUCCH and a corresponding periodicity of the PUCCH. The based on a resource configuration of the PUCCH may include the following two cases: All PUCCH resources configured by the network device are used to perform beam failure recovery; or some PUCCH resources configured by the network device or no PUCCH resource configured by the network device are/is used to perform beam failure recovery. In other words, this is determined by the terminal device. For example, in the technical solutions provided in the third aspect and the fourth aspect, the transmit beam of the PUCCH is not configured by the network device.

This application further provides a computer storage medium. The computer storage medium stores a computer program (instruction). When the program (instruction) is run on a computer, the computer is enabled to perform the method according to any one of the foregoing aspects.

This application further provides a computer program product. When the computer program product runs on a computer, the computer is enabled to perform the method according to any one of the foregoing aspects.

This application further provides a chip. The chip stores an instruction. When the instruction is run on a communications device, the communications device is enabled to perform the corresponding methods according to the foregoing aspects.

This application further provides an apparatus. The apparatus includes a memory, a processor, and a computer program that is stored in the memory and that can be run on the processor. When executing the computer program, the processor implements the corresponding methods according to the foregoing aspects.

This application further provides an apparatus. The apparatus includes a processor. The processor is configured to couple to a memory, read an instruction in the memory, and implement, according to the instruction, the corresponding methods according to the foregoing aspects. It may be understood that the memory may be integrated into the processor, or may exist independent of the processor.

This application further provides an apparatus. The apparatus includes a processor. When executing a computer program, the processor implements the corresponding methods according to the foregoing aspects. The processor may be a dedicated processor.

This application further provides a system, including the foregoing provided terminal-side apparatus and the foregoing provided network-side apparatus. These system compositions separately implement the corresponding methods according to the foregoing aspects.

It may be understood that any apparatus, computer storage medium, computer program product, chip, or system provided above is configured to implement the corresponding method provided above. Therefore, for beneficial effects that can be achieved by the apparatus, computer storage medium, computer program product, chip, or system, refer to beneficial effects of the corresponding method, and details are not described herein again.

BRIEF DESCRIPTION OF DRAWINGS

To describe the technical solutions in the embodiments of this application more clearly, the following briefly describes the accompanying drawings for describing the embodiments of this application. The accompanying drawings in the following description show merely some embodiments of this application, and a person of ordinary skill in the art may still derive other drawings from the embodiments of this application and these accompanying drawings without creative efforts.

DESCRIPTION OF EMBODIMENTS

Figure 1:
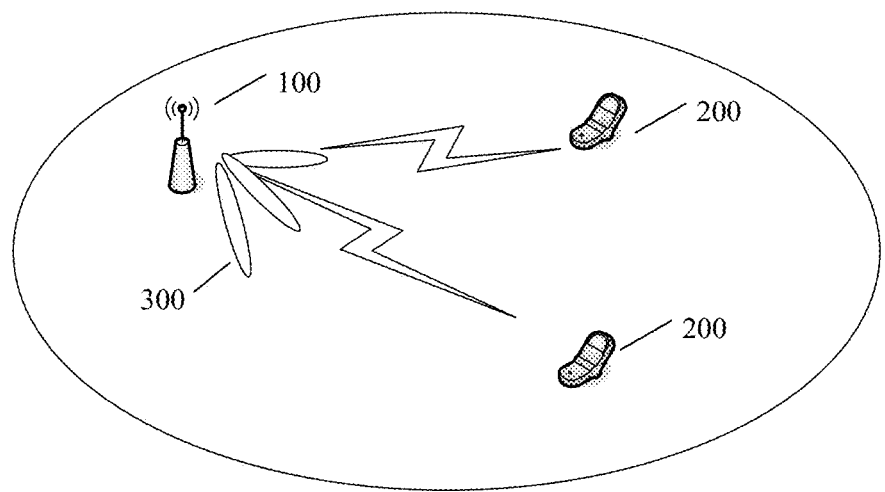
FIG. 1 shows an architecture of a network system in this application.

To make the technical problems resolved, the technical solutions used, and the technical effects achieved in this application clearer, the following describes the technical solutions in this application with reference to the accompanying drawings in the embodiments. The detailed descriptions provide various embodiments of a device and/or a process by using block diagrams, flowcharts, and/or examples. These block diagrams, flowcharts, and/or examples include one or more functions and/or operations, so a person in the art may understand that each function and/or operation in the block diagrams, the flowcharts, and/or the examples may be performed independently and/or jointly by using much hardware, software, and firmware, and/or any combination thereof.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B may be singular or plural. The character "/" generally indicates an "or" relationship between the associated objects. "At least one item (piece) of the following" or a similar expression thereof means any combination of these items, including any combination of singular items (pieces) or plural items (pieces). For example, at least one item (piece) of a, b, or c may indicate: a, b, c, a-b, a-c, b-c, or a-b-c, where a, b, and c may be singular or plural. In this application, the terms "first", "second", "third", "fourth", and so on are intended to distinguish between different objects but do not indicate a particular order of the objects.

In this application, nouns "network" and "system" are usually interchangeably used, but a person skilled in the art can understand meanings of the nouns. In some cases, all "terminals"/"terminal devices" mentioned in this application may be mobile devices, for example, mobile phones, personal digital assistants, handheld or laptop computers, and similar devices having a telecommunications capability. In some cases, the "terminals"/"terminal devices" may alternatively be wearable devices or vehicle-mounted devices, and include terminals in a 5G network, terminals in a future evolved PLMN network, or the like. Such a terminal may include a device and a removable storage module associated with the device (for example, including but not limited to, a subscriber identification module (Subscriber Identification Module, SIM for short) application, a universal subscriber identification module (Universal Subscriber Identification Module, USIM for short) application, or a universal integrated circuit card (Universal Integrated Circuit Card, UICC for short) of a removable user identity module (Removable User Identity Module, R-UIM for short) application). Alternatively, such a terminal may include a device that does not have the module. In another case, the term "terminal"/ "terminal device" may be a non-portable device having a similar capability, for example, a desktop computer, a set top box, or a network device. The term "terminal"/"terminal device" may alternatively be any hardware or software component that can terminate a communication session of a user. In addition, "user terminal", "User Equipment", "UE", "site", "station", "STA", "user equipment", "user agent", "User Agent", "UA", "mobile device", and "device" are substitute terms that are synonymous with the "terminal"/ "terminal device" in this specification. For ease of description, in this application, the foregoing devices are collectively referred to as user equipment or UE.

An "access node" mentioned in this application is a network device, is an apparatus deployed in a radio access network to provide a wireless communication function for a terminal device, and has functions such as being responsible for scheduling and configuring a downlink reference signal for UE. The access node may include macro base stations, micro base stations, relay stations, access points, and the like in various forms, and may be a base transceiver station (Base Transceiver Station, BTS for short) in a global system for mobile communications (Global System of Mobile communication, GSM for short) or code division multiple access (Code Division Multiple Access, CDMA for short), or may be a NodeB (NodeB, NB for short) in wideband code division multiple access (Wideband Code Division Multiple Access, WCDMA for short), or may be an evolved NodeB (Evolutional Node B, eNB or eNodeB for short) in long term evolution (Long Term Evolution, LTE for short), or a relay station or an access point, a transmission node or a transmission reception point (transmission reception point, TRP or TP for short) or a next generation NodeB (generation nodeB, gNB for short) in a new radio (New Radio, NR for short) system, a wireless-fidelity (Wireless-Fidelity, Wi-Fi for short) station, a wireless backhaul node, a small cell, a micro base station, a base station in a future 5th generation mobile communications (the 5th Generation Mobile Communication, 5G for short) network, or the like. This is not limited in this application. In systems using different radio access technologies, names of devices having functions of an access node may vary. For ease of description, in this application, the foregoing apparatuses providing a wireless communication function for UE are collectively referred to as the access node.

In this application, beam-based communication means, in a mobile communications system, performing transmission by using a beam, to be specific, sending a signal in a specific direction in space. This can implement a higher antenna array gain. The beam may be implemented by using a technology such as beamforming (Beamforming). For example, an important research area in high frequency (high frequency, HF for short) communication is analog and digital hybrid beamforming (hybrid Beamforming). This can well combat loss of a high frequency signal caused by a transmission distance, and control complexity and hardware costs to be within an acceptable level.

In the technologies in this application, related terms are defined as follows:

Quasi-co-location (quasi-co-location, QCL for short): A quasi-co-location relationship is used to indicate that a plurality of resources have one or more same or similar communication features. A same or similar communication configuration may be used for the plurality of resources having the quasi-co-location relationship. For example, if two antenna ports have a quasi-co-location relationship, a large-scale channel characteristic of transmitting one symbol by one port may be deduced from a large-scale channel characteristic of transmitting one symbol by the other port. The large-scale characteristic may include delay spread, an average delay, Doppler spread, a Doppler frequency shift, an average gain, a receive parameter, a receive beam number of a terminal device, transmit/receive channel correlation, an angle of arrival, spatial correlation of a receiver antenna, a dominant angle of arrival (Angle-of-Arrival, AoA), an average angle of arrival, AoA spread, and the like. Specifically, a quasi-co-location indication is used to indicate whether at least two groups of antenna ports have a quasi-co-location relationship: the quasi-co-location indication is used to indicate whether channel state information reference signals sent by the at least two groups of antenna ports are from a same transmission point; or the quasi-co-location indication is used to indicate whether channel state information reference signals sent by the at least two groups of antenna ports are from a same beam group.

Quasi-co-location assumption (QCL assumption): This means assuming whether there is a QCL relationship between two ports. Configuration and indication of the quasi-co-location assumption may be used to help a receiving side receive and demodulate a signal. For example, the receiving side can determine that there is a QCL relationship between a port A and a port B. In other words, a large-scale parameter of a signal measured on the port A may be used for signal measurement and demodulation on the port B.

Beam (beam): A beam is a communication resource. The beam may be a wide beam, a narrow beam, or a beam of another type. A technology for forming the beam may be a beamforming technology or another technology. The beamforming technology may be specifically a digital beamforming technology, an analog beamforming technology, or a digital/analog mixed beamforming technology. Different beams may be considered as different resources. Same information or different information may be sent by using different beams. Optionally, a plurality of beams having same or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It may be understood that, one or more antenna ports forming one beam may also be considered as one antenna port set. In a protocol, the beam may also be embodied as a spatial filter (spatial filter).

Beam information may be identified by using index information. Optionally, the index information may correspond to a resource identity configured for UE. For example, the index information may correspond to an ID or a resource configured for a channel state information reference signal (Channel status information Reference Signal, CSI-RS for short), or may correspond to an ID or a resource configured for an uplink sounding reference signal (Sounding Reference Signal, SRS for short). Alternatively, optionally, the index information may be a signal carried by using a beam or index information explicitly or implicitly carried on a channel. For example, the index information may be a synchronization signal sent by using a beam or index information that is of the beam and that is indicated by using a broadcast channel.

Alternatively, optionally, the beam information may be identified by using an absolute index of the beam, a relative index of the beam, a logical index of the beam, an index of an antenna port corresponding to the beam, an index of an antenna port group corresponding to the beam, and a time index of a downlink synchronization signal block; beam pair link (beam pair link, BPL) information, a transmit parameter (Tx parameter) corresponding to the beam, a receive parameter (Rx parameter) corresponding to the beam, a transmit weight (weight) corresponding to the beam, a weight matrix (weight vector), a weight vector (weight matrix), and a receive weight corresponding to the beam, or indexes of them; a sending codebook (codebook) corresponding to the beam, a receiving codebook corresponding to the beam, or indexes of them.

Spatial quasi-co-location (spatial QCL): The spatial QCL may be considered as a type of QCL. Spatial may be understood from two perspectives: from a transmitting side or from a receiving side. From the perspective of the transmitting side, if two antenna ports have a spatial quasi-co-location relationship, it means that directions of beams corresponding to the two antenna ports are the same in space. From the perspective of the receiving side, if two antenna ports have a spatial quasi-co-location relationship, it means that the receiving side can receive, in a same beam direction, signals sent by the two antenna ports.

FIG. 1 shows an architecture of a network system in this application. This application is applicable to a beam 300-based multicarrier communications system shown in FIG. 1, for example, 5G new radio (New Radio, NR for short). The system includes uplink (UE 200 to an access node 100) communication and downlink (the access node 100 to the UE 200) communication in a communications system. According to a long term evolution (Long Term Evolution, LTE)/NR protocol, the uplink communication at a physical layer includes transmission of a physical uplink channel and an uplink signal. The physical uplink channel includes a random access channel (Random access channel, PRACH for short), an uplink control channel (Physical uplink control channel, PUCCH for short), an uplink data channel (Physical uplink shared channel, PUSCH for short), and the like, and the uplink signal includes a channel sounding signal SRS, an uplink control channel demodulation reference signal (PUCCH De-modulation Reference Signal, PUCCH-DMRS for short), an uplink data channel demodulation reference signal PUSCH-DMRS, an uplink phase noise tracking signal (phase noise tracking reference signal, PTRS for short), and the like. The downlink communication includes transmission of a physical downlink channel and a downlink signal. The physical downlink channel includes a broadcast channel (Physical broadcast channel, PBCH for short), a downlink control channel (Physical downlink control channel, PDCCH for short), a downlink data channel (Physical downlink shared channel, PDSCH for short), and the like, and the downlink signal includes a primary synchronization signal (Primary Synchronization Signal, PSS for short)/a secondary synchronization signal (Secondary Synchronization Signal, SSS for short), a downlink control channel demodulation reference signal PDCCH-DMRS, a downlink data channel demodulation reference signal PDSCH-DMRS, a phase noise tracking signal PTRS, a channel state information reference signal (Channel status information reference signal, CSI-RS), a cell signal (Cell Reference Signal, CRS for short) (there is no SRS in NR), a fine synchronization signal (Time/frequency tracking Reference Signal, TRS for short) (there is no TRS in LTE), and the like.

In NR, a beam indication of a beam used for a downlink channel or a beam indication of a beam sending a reference signal is implemented by being associated with a reference resource index in a transmission configuration indicator (Transmission Configuration Indicator, TCI for short) status table.

For uplink transmission, a spatial quasi-co-location relationship is not defined in NR, and an uplink beam indication is directly implemented by using a reference signal resource identifier.

In uplink communication and downlink communication, a beam failure may occur after communication quality between a transmit beam and a receive beam of a physical downlink channel deteriorates. In the NR protocol, in a beam detection interval (which may correspond to one reporting periodicity), when beam quality of all physical downlink channels that need to be detected is lower than a threshold, it may be considered as one beam failure instance. It should be noted that UE implements beam detection by using a beam detection signal. For at least one beam detection signal, the UE already learns of a periodicity of each beam detection signal before detection. Therefore, the UE knows beam detection signals that arrive and that need to be detected in a current beam detection interval, and detects a beam detection signal that needs to be detected. When a quantity of times for which beam failure instances consecutively occur reaches a maximum quantity of times (where the maximum quantity of times may be configured by the access node 100, or may be a specific value specified in a protocol), it may be determined that a beam failure occurs.

In this application, in the system shown in FIG. 1, the access node 100 may configure a set $\bar{q}_0$ for the UE 200 for beam failure detection by using higher layer signaling, for example, radio resource control (Radio Resource Control, RRC for short) signaling. It should be noted that the set may not be configured by the access node 100, but may be determined by the UE 200 according to a TCI indication of a physical downlink channel such as a downlink control channel. The set optionally includes one or more periodic CSI-RS resource indexes. The access node 100 further configures, for the UE, a physical uplink control channel PUCCH resource used for beam failure recovery, where the PUCCH resource includes a transmit beam of a corresponding PUCCH, and there may be one or more PUCCH resources. Optionally, the access node 100 may further configure, for the UE 200 by using higher layer signaling (for example, RRC signaling), a set $\bar{q}_1$ as a candidate beam set (where the set may alternatively be determined by the UE 200), and the set optionally includes a CSI-RS resource index and/or an SSB resource index. Optionally, the access node 100 configures, for the UE 200 by using higher layer signaling (for example, RRC signaling), a maximum quantity N (where the quantity N may not be configured by the access node 100, but may be a specific value specified in a protocol) of beam failure instances, a threshold Qin for a candidate beam after a beam failure, information about a random access channel (Random Access Channel, RACH for short) used for beam recovery of the UE 200, a RACH resource corresponding to the candidate beam used for beam recovery of the UE 200, a control resource set (control resource set) that is used to detect a beam failure recovery acknowledgment and that is used for beam recovery of the UE 200, and the like. In addition, the higher layer signaling further includes some other configuration information, including a beam recovery timer, a beam recovery acknowledgement timer, and a maximum quantity of transmission times of the beam recovery request. When the access node 100 does not configure the set $\bar{q}_0$, the UE 200 should determine $\bar{q}_0$ based on a TCI state corresponding to a physical downlink channel (such as a PDCCH) that is currently required to be detected, to include an SSB and/or a periodic CSI-RS that has a spatial QCL relationship with the channel (such as the PDCCH) into $\bar{q}_0$. The threshold Qin is a physical layer reference signal received power (Layer 1-Reference Signal Received Power, L1-RSRP for short) threshold of the CSI-RS, and a threshold of the SSB may be deduced by using powerControlOffsetSS (that is, PC_ss, indicating a power offset between a CSI-RS resource element and a resource element of the SSB) in higher layer signaling and Qin.

The downlink control channel PDCCH is used as an example. The UE 200 evaluates quality of the control channel by using an RS that meets a spatial quasi-co-location relationship with a DMRS of the PDCCH and that is in $\bar{q}_0$. Specifically, the UE 200 estimates a block error rate (Block Error Rate, BLER for short) of the PDCCH (PDCCH-hypothetical-BLER) by using an RS that meets a condition. In a beam detection interval (which may correspond to a reporting periodicity), when hypothetical-BLERs of all downlink control channels that need to be detected are greater than a threshold (for example, may be 0.1), a physical layer of the UE 200 determines one beam failure instance and reports the beam failure instance to a MAC layer of the UE 200 side at a specified periodicity.

The MAC layer of the UE 200 side counts beam failure instances reported by the physical layer. When the quantity of times for which beam failure instances consecutively occur reaches a maximum value N configured by the access node 100, the MAC layer may determine that a beam failure occurs, start a beam failure recovery timer, and notify the physical layer of the UE 200 that the beam failure occurs. Optionally, after receiving a beam failure indication of the MAC layer, the physical layer of the UE 200 reports a beam measurement result of a reference signal that meets the threshold Qin for the candidate beam in the set $\bar{q}_0$, where a reporting form is one or more groups of {beam RS index, L1-RSRP measurement result}. The MAC layer of the UE 200 selects an RS index of a candidate beam according to a rule based on the measurement result and the beam that are reported by the physical layer, searches for a corresponding PUCCH resource based on the RS index, and feeds back the selected beam index $q_{new}$ and the PUCCH resource corresponding to the beam index $q_{new}$ to the physical layer. The physical layer of the UE 200 sends a beam failure recovery request (Beam-failure-recovery-request) on a specified PUCCH resource by using a corresponding PUCCH transmit beam to the access node 100 based on a PUCCH periodicity pre-configured by the access node 100 or predefined in a specification. After a predetermined quantity of slots after sending the beam failure recovery request, the UE 200 monitors, by using a beam corresponding to $q_{new}$, a control resource set CORESET that is allocated by using higher layer signaling and that is used for a beam failure recovery acknowledgment, where acknowledgement content is possible downlink control information (DCI) scrambled by using a C-RNTI scrambling code. If the acknowledgement is successfully obtained, beam recovery succeeds, and a normal beam management procedure is started. If no valid acknowledgement is successfully received within a time window, the foregoing process is repeated starting from sending the beam recovery request until a quantity of times for which the beam recovery request is sent reaches a maximum quantity of times or the beam failure recovery timer expires.

In the foregoing, a beam failure detection and recovery procedure in the system is implemented. It should be noted that, FIG. 1 shows merely an example of the architecture of the network system in this application, and this application is not limited thereto.

Embodiment 1

Figure 2:
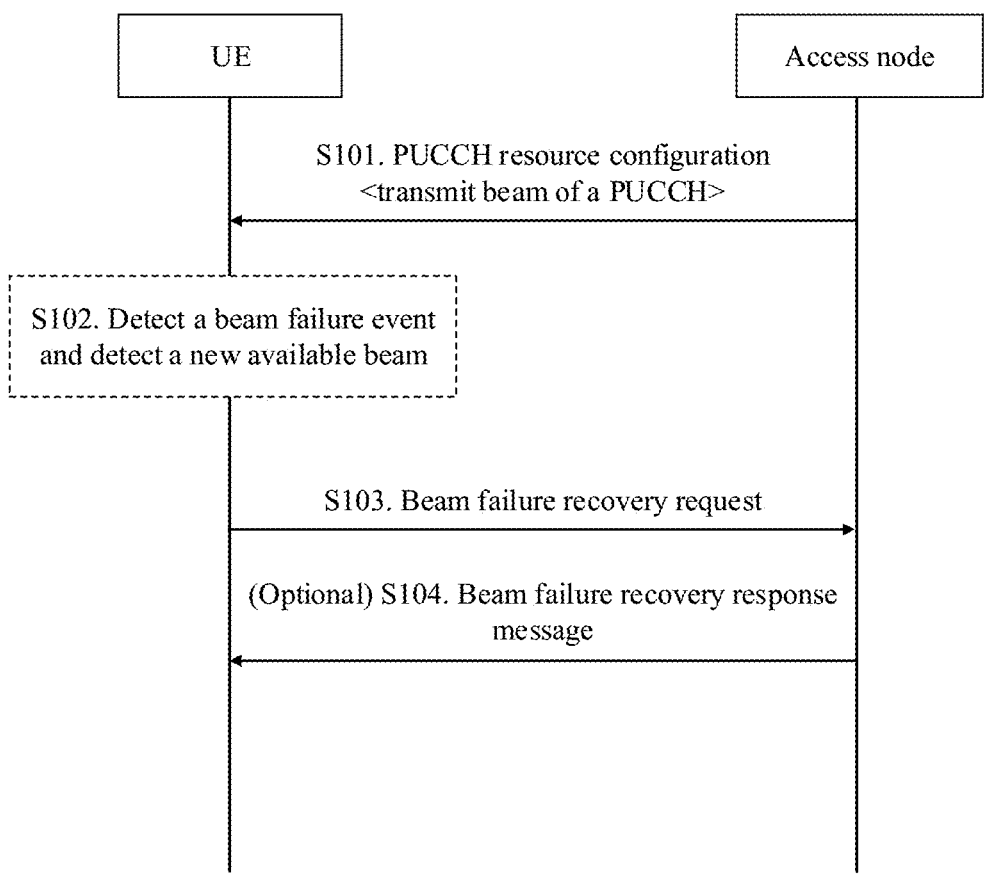
FIG. 2 is a flowchart of a first embodiment of a resource configuration method according to this application.

To flexibly and effectively perform beam failure recovery, an access node configures, for UE, a PUCCH resource used for beam failure recovery. In this embodiment, an example in which a quantity of PUCCH resources is not limited to one is used for description. It should be noted that in this embodiment and subsequent embodiments, interaction between UE and an access node is used for description, and this is merely an example for description. This application is not limited thereto. When a transmission reception point TRP managed by an access node in a network has some related functions of the access node, this application may be further applied to a scenario in which UE interacts with the TRP. According to this embodiment of this application, FIG. 2 is a flowchart of a first embodiment of a resource configuration method according to this application. For ease of understanding the solution, behavior on sides of both UE and an access node are described in this embodiment and the subsequent embodiments. Descriptions are provided from perspectives of all interacting parties. However, this in no way restricts that improvements in the system are to combine steps of all the interacting parities. The technical solution provided in this application has improvements on each side in the system.

The method includes the following steps.

S101. The access node sends a resource configuration of a physical uplink control channel PUCCH used for beam failure recovery to the UE, where the resource configuration of the PUCCH includes a corresponding transmit beam of the PUCCH.

Optionally, the resource configuration of the PUCCH may further include at least one of the following: a communication resource (for example, a time domain resource, a frequency domain resource, and/or a code domain resource corresponding to the PUCCH, for example, a mask used to send the PUCCH used for beam failure recovery) of the PUCCH, a time offset of the PUCCH, a format of the PUCCH, and a periodicity of the PUCCH. Further, optionally, the PUCCH resource further includes: an association relationship between a use time of the transmit beam and the periodicity of the PUCCH, and/or an association relationship between the use time of the transmit beam and the time offset of the PUCCH. It should be noted that the use time of the transmit beam is a time for transmitting a downlink signal by using the transmit beam.

Further, optionally, in addition to the periodicity/offset, the transmit beam may be further associated with the following information: a PUCCH start symbol, a symbol length, a start slot, a slot length, a start frequency domain location, a frequency domain resource size, a scrambling code sequence, an orthogonal mask sequence, a cyclic shift sequence, a cyclic shift hopping method, a phase rotation size, a sequence hopping method, a quantity of valid bits, a coding method, a bit rate, a frequency hopping pattern, a modulation method, an order of the modulation method, a waveform, a transmit power, a PUCCH format, PUCCH content, and the like. Therefore, the resource configuration of the PUCCH may further include the pieces of information and/or association relationships between the pieces of information and the transmit beam.

Optionally, the PUCCH includes a long PUCCH such as a PUCCH occupying 4 to 14 OFDM symbols, and a short PUCCH such as a PUCCH occupying one or two OFDM symbols. The PUCCH may be transmitted in one slot, or may be transmitted across slots. The start symbol, a quantity of symbols, and a quantity of slots are all configurable.

The PUCCH may carry different quantities of bits, for example, may carry zero bits, one bit, two bits, or a plurality of bits. The zero bits indicate whether there is a signal, and the signal does not carry valid information. Both the coding method and the code rate of the PUCCH are configurable.

Sequence hopping (sequence hopping) and cyclic shift hopping (cyclic shift hopping) may be configured for a transmission sequence of the PUCCH.

A frequency hopping (frequency hopping) method or a frequency hopping pattern may be configured for a frequency resource of the PUCCH. To be specific, a terminal transmits the PUCCH by using different frequency resources within different time periods, to obtain frequency-domain diversity. The frequency hopping method includes intra-slot frequency hopping and inter-slot frequency hopping.

A scrambling operation, a mask operation, and another operation may be configured for the transmission sequence of the PUCCH to distinguish between different terminals. That is, different scrambling codes, orthogonal masks, and the like are used for different terminals, so that the terminals are distinguished on a receive end.

The PUCCH may be transmitted using different modulation schemes, such as binary phase shift keying (binary phase shift keying, BPSK for short), Pi/2 BPSK, quadrature phase shift keying (quadrature phase shift keying, QPSK for short), and the like.

The PUCCH may be transmitted using different waveforms, such as cyclic prefix orthogonal frequency division multiplexing (cyclic prefix Orthogonal Frequency Division Multiplexing, CP-OFDM for short), discrete Fourier transform spread OFDM (discrete Fourier transform spread OFDM, DFT-s-OFDM for short), and the like.

The transmit power of the PUCCH is calculated by the terminal based on an indication of a base station. Information indicated by the base station includes a path loss, a power accumulation parameter, and the like.

The PUCCH may be used for different purposes, for example, sending a scheduling request, sending hybrid automatic repeat request (Hybrid Automatic Repeat reQuest, HARQ for short) acknowledgement (Acknowledgement, ACK for short)/negative acknowledgement (negative ACK, NACK for short) information, and sending CSI information. In the present invention, the PUCCH is also used to send a beam failure recovery request.

A PUCCH may be reused for different purposes. For example, one PUCCH may be used to send a scheduling request+a HARQ ACK. In the present invention, one PUCCH may be used to send a beam failure recovery request+CSI (that is, beam reporting).

When the base station cannot distinguish between purposes of the PUCCH, for example, when the scheduling request and the beam failure recovery request may have a same bit length, a further distinguishing method may be introduced. For example, different scrambling codes, masks, cyclic shifts, transmit powers, frequency hopping patterns, and the like are used for the scheduling request and the beam failure recovery request. Alternatively, further information exchange may be introduced. For example, the base station delivers a downlink control channel to schedule the terminal to perform uplink transmission, and requires the terminal to include information indicating a purpose of the PUCCH in the uplink transmission.

Optionally, the resource configuration of the PUCCH includes a communication resource of the PUCCH, and the communication resource of the PUCCH may be associated with resources of downlink signals corresponding to candidate beams in a candidate beam set $\bar{q}_1$ (a beam set used for beam failure recovery and configured by a network side), or may be associated with one or more resources of an uplink signal/uplink signals (for example, an SRS). There may be one or more PUCCH communication resources. When there are a plurality of PUCCH communication resources, the PUCCH communication resources may be one-to-one associated with the resources of the downlink signals corresponding to the beams in $\bar{q}_1$, and/or may be one-to-one associated with the resources of the uplink signals. Optionally, when there are a plurality of PUCCH communication resources, some PUCCH communication resources may be one-to-one associated with resources of downlink signals corresponding to beams in $\bar{q}_1$ and/or may be one-to-one associated with resources of uplink signals, and each of one or some PUCCH communication resources is one-to-many associated with resources of downlink signals corresponding to beams in $\bar{q}_1$ and/or is one-to-many associated with resources of uplink signals. A configuration manner in which there is one-to-many association in a plurality of PUCCH communication resources is similar to a configuration manner in a case in which there is only one PUCCH communication resource, and is not described in detail in this embodiment. Specific descriptions are provided in subsequent embodiments. Examples in configuration relationship tables in this embodiment are described by using cases in which there are a plurality of PUCCH communication resources, including a case in which the plurality of PUCCH communication resources are one-to-one associated with downlink signals or uplink signals, and a case in which some PUCCH communication resources in the plurality of PUCCH communication resources are one-to-one associated with downlink signals and/or uplink signals. For example, for a configuration manner in which all or some PUCCH communication resources are one-to-one associated with downlink signals, the following table specifically provides reference signals {CSI-RS resource #x and CSI-RS resource #y} that are associated with the PUCCH communication resources (resource) and that are in the candidate beam set.

TABLE 1

| PUCCH resource | Downlink signal |
|---|---|
| PUCCH resource #x | CSI-RS resource #x |
| PUCCH resource #y | CSI-RS resource #y |
| ... | ... |

According to the configuration in Table 1, for a communication resource of the PUCCH resource #x, a communication resource of the CSI-RS resource #x is used as a reference; for a communication resource of the PUCCH resource #y, a communication resource of the CSI-RS resource #y is used as a reference.

In addition, for information about a transmit beam that is of a PUCCH and used by the UE to send the PUCCH and that is included in the resource configuration of the PUCCH, an example of a configuration may be that shown in Table 2.

TABLE 2

| PUCCH resource | UE transmit beam indication (PUCCH spatial info) |
|---|---|
| PUCCH resource #x | CSI-RS resource #x |
| PUCCH resource #y | CSI-RS resource #y |
| ... | ... |

In Table 2, a transmit beam (that is, a sending beam) indication of a PUCCH is indicated by a resource index of a downlink reference signal RS. This indicates that the access node expects the UE to send, by using a transmit beam corresponding to a receive beam used to receive the downlink RS, a PUCCH used for a beam failure recovery request. The PUCCH spatial info may alternatively be configured as another downlink RS (such as a synchronization signal block or a tracking signal) or an uplink signal (such as a sounding signal SRS). If the PUCCH spatial info is configured as being associated with an uplink signal, this indicates that the access node expects the UE to send, based on the transmit beam that is of the uplink signal and that is previously trained, the PUCCH used for the beam failure recovery request. An example of specific configuration may be that shown in Table 3.

TABLE 3

| PUCCH resource | UE transmit beam indication (PUCCH spatial info) |
|---|---|
| PUCCH resource #x | SRS resource #x |
| PUCCH resource #y | SRS resource #y |
| ... | ... |

It should be noted that, if PUCCH communication resources are one-to-one associated with uplink signals, the access node may directly configure the PUCCH to be associated with resources of the uplink signals. The association relationship includes that beam information of the PUCCH is configured as an SRS resource (as shown in Table 3). The PUCCH communication resource may not be limited. Optionally, the PUCCH communication resource may be associated with a downlink signal in the configuration manner shown in Table 1. Optionally, the PUCCH communication resource may be associated with a communication resource of an uplink signal.

S102. The UE detects a beam failure event and detects a new available beam.

A downlink control channel PDCCH is used as an example. The UE evaluates quality of the control channel by using an RS that meets a spatial quasi-co-location relationship with a DMRS of the PDCCH and that is in a set $\bar{q}_0$ used for beam failure detection that is configured by the access node. Specifically, the UE 200 estimates a block error rate (Block Error Rate, BLER for short) of the PDCCH (PDCCH-hypothetical-BLER) by using an RS that meets a condition. In a beam detection interval (which may correspond to a reporting periodicity), when hypothetical-BLERs of all downlink control channels that need to be detected are greater than a threshold (for example, may be 0.1), one beam failure instance is determined. The UE counts beam failure instances. When a quantity of times for which beam failure instances consecutively occur reaches a maximum value N configured by the access node, it may be determined that the beam failure event is detected. A specific method for detecting a beam failure by the UE is not limited in this embodiment. The UE detects a downlink signal corresponding to a beam in the candidate beam set to determine the new available beam. For example, in this embodiment, it is assumed that the UE determines that a downlink beam represented by the CSI-RS resource #x meets a communication condition, and the downlink beam becomes a new available beam.

S103. When detecting the beam failure event, the UE sends a beam failure recovery request to the access node based on the resource configuration of the PUCCH and a corresponding periodicity of the PUCCH.

The PUCCH in this embodiment needs to have a periodic characteristic. Particularly, on a base station side, a receive beam corresponding to a PUCCH communication resource needs to be periodically used to receive a PUCCH message that may be sent by the UE and that is used for a beam recovery request. However, on a UE side, the PUCCH is sent based on the periodicity of the PUCCH, only when a beam failure event occurs and a new available beam of the PUCCH is determined. Optionally, the periodicity of the PUCCH may be configured by the access node, and optionally, the periodicity of the PUCCH may also be a preset periodicity, for example, a periodicity given in various types of protocols and specifications. Further, optionally, the periodicity may be related to a periodicity of an associated downlink signal resource or an uplink signal resource, or may be related to a reporting periodicity corresponding to a downlink signal.

Figure 3:
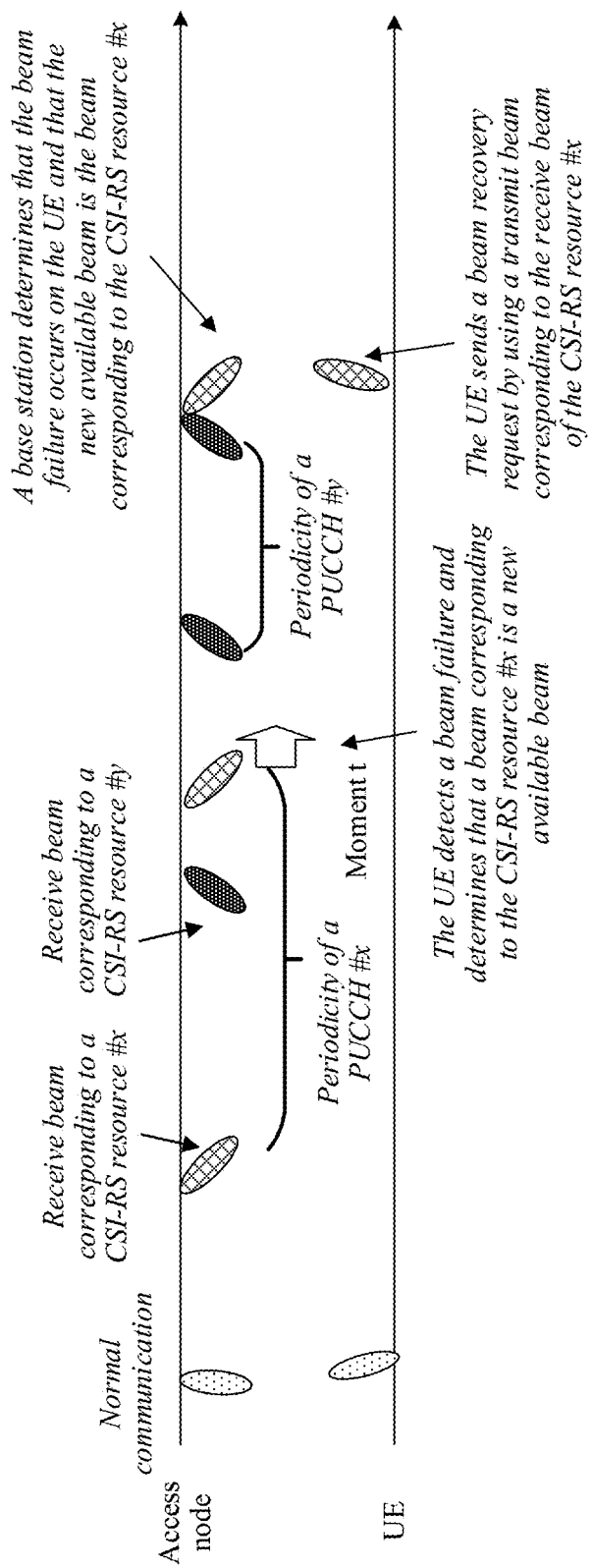
FIG. 3 is a schematic diagram of a communication occasion for performing beam failure recovery by UE according to this application.

For example, a PUCCH resource is associated with a CSI-RS resource. FIG. 3 is a schematic diagram of a communication occasion for performing beam failure recovery by UE. Using a resource associated with a CSI-RS in downlink signals as an example, the access node configures, for the UE, a plurality of PUCCH resources (a PUCCH resource #x and a PUCCH resource #y) associated with candidate beams (a CSI-RS resource #x and a CSI-RS resource #y) in the candidate beam set. For an example of specific configuration manner refer to Table 1 and Table 2 in S101. The access node periodically monitors, based on a periodicity that is of a PUCCH #x and that corresponds to the PUCCH resource #x and by using a receive beam corresponding to the CSI-RS resource #x, whether a beam failure recovery request sent by the UE is received. The access node periodically monitors, based on a periodicity that is of a PUCCH #y and that corresponds to the PUCCH resource #y and by using a receive beam corresponding to the CSI-RS resource #y, whether a beam failure recovery request sent by the UE is received. At a moment t, the UE detects a beam failure and determines that a beam corresponding to the CSI-RS resource #x is a new available beam. Because the PUCCH resource is associated with the resource of the CSI-RS resource #x, the UE may use the resource of the PUCCH #x and a transmit beam of a PUCCH associated with the CSI-RS resource #x to perform transmission, that is, a transmit beam corresponding to a beam on which the UE receives a CSI-RS corresponding to the CSI-RS resource #x is the transmit beam of the PUCCH. It should be noted that after detecting the beam failure, the UE does not necessarily immediately perform beam failure recovery, instead, on a corresponding resource, the UE uses the transmit beam corresponding to the receive beam of the CSI-RS resource #x as the transmit beam of the PUCCH to send a failure recovery request to the access node based on the periodicity of the PUCCH #x, and/or notify the access node of information about the new available beam. Because the access node configures the PUCCH resource #x, including information (for example, a sequence) about a communication resource and a beam, the access node can receive the PUCCH resource #x on the receive beam corresponding to the transmit beam for sending the CSI-RS resource #x. According to a configuration of the access node or a predefinition, a PUCCH that is fed back by the UE and that is used for a beam failure recovery request may not include valid information (payload), and the base station can determine, by using an association relationship between the PUCCH resource #x and the CSI-RS resource #x, that an available beam fed back by the UE is the CSI-RS resource #x. Alternatively, according to a configuration of the access node or a predefinition, a PUCCH fed back by the UE may include valid information, and the valid information indicates that a new available beam selected by the UE is the CSI-RS resource #x. In addition, the UE may further feed back beam quality corresponding to the CSI-RS resource #x, for example, L1-RSRP measured by using the CSI-RS resource #x. If the transmit beam of the PUCCH is configured as a transmit beam of an uplink signal, in this example, a transmit beam of a corresponding uplink signal is used on a corresponding communication resource to send the beam failure recovery request to the access node, and related information of the new available beam selected by the UE may be further indicated.

It should be noted that, when the PUCCH transmit beam configured in S101 is a beam for transmitting an uplink signal, the UE further sends beam information to the access node when the UE uses a transmit beam other than the transmit beam in beams for transmitting uplink signals to send the beam failure recovery request to the access node, where the beam information is used to indicate the beam for sending the beam failure recovery request.

S104. The access node sends a transmit beam failure recovery response message to the UE.

The UE needs to detect a response of the access node. After the access node receives the beam failure information and the information about the new available beam that are reported by the UE by using the PUCCH, the access node may send the response to the UE by using the available beam, so that the UE determines that the beam failure information and the new beam information are successfully received by the access node. In addition, subsequent communication may be performed based on the new beam reported by the UE. The response may be a PDCCH, or the response may be a PDCCH and a PDSCH is scheduled. Optionally, the UE receives the response of the access node by using the receive beam corresponding to the beam sending the PUCCH used for the beam failure recovery request in 103.

It should be noted that the access node does not necessarily send a response to the UE. In other words, the UE does not necessarily receive a response from the access node after sending the beam failure recovery request. If the UE does not receive a response within a predetermined time, it is considered that the beam failure recovery request fails. Optionally, the beam failure recovery request may be sent for a plurality of times within the predetermined time.

According to the resource configuration method in this embodiment of this application, the PUCCH resource used for beam failure recovery is configured, so that the UE can flexibly and effectively perform beam failure recovery.

Embodiment 2

Figure 4:
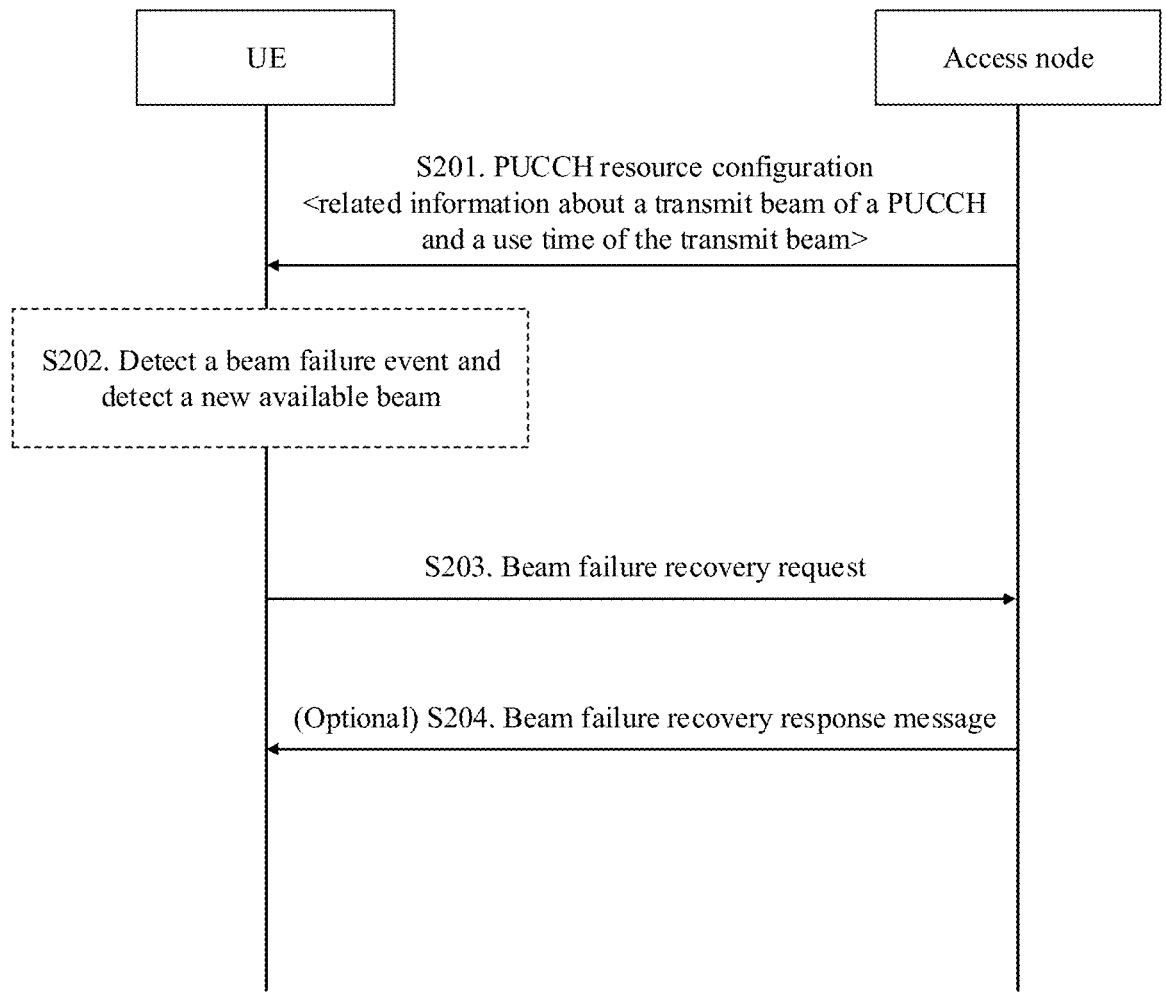
FIG. 4 is a flowchart of a second embodiment of a resource configuration method according to this application.

FIG. 4 is a flowchart of a second embodiment of a resource configuration method according to this application. A difference from Embodiment 1 lies in that, in this embodiment, one PUCCH communication resource corresponds to a plurality of resources of uplink/downlink signals in a one-to-many configuration manner, or each of one or more PUCCH communication resources in a plurality of PUCCH communication resources corresponds to a plurality of resources of uplink/downlink signals in a one-to-many configuration manner. Content that is the same as or similar to that in Embodiment 1 is not described again in this embodiment. It should be noted that, for ease of understanding of the solution, in this embodiment, actions on both sides of UE and an access node are described, and an overall description is provided from perspectives of a plurality of parties of interaction. However, an improvement in a system is not limited to that steps on all sides of interaction need to be performed together. In the technical solution provided in this application, improvements are made on each side of the system.

The method includes the following steps.

S201. The access node sends a resource configuration of a physical uplink control channel PUCCH used for beam failure recovery to the UE, where the resource configuration of the PUCCH includes a corresponding transmit beam of the PUCCH and related information about a use time of the transmit beam.

Optionally, the resource configuration of the PUCCH may further include at least one of the following: a communication resource of the PUCCH, a time offset of the PUCCH, a format of the PUCCH, and a periodicity of the PUCCH. Further, optionally, the related information about the use time of the transmit beam includes: an association relationship between a use time of the transmit beam and the periodicity of the PUCCH, and/or an association relationship between the use time of the transmit beam and a time offset of the PUCCH.

Optionally, the resource configuration of the PUCCH includes a communication resource of the PUCCH, and the communication resource of the PUCCH may be associated with resources of downlink signals corresponding to candidate beams in a candidate beam set or may be associated with one or more resources of an uplink signal/uplink signals (for example, an SRS). In this embodiment, the communication resource of the PUCCH is one-to-many associated with resources of downlink/uplink signals. However, a quantity of transmit beams of the PUCCH is not limited to one, and there may be a plurality of transmit beams. For a plurality of cases, for example, for one PUCCH communication resource (which may be a PUCCH communication resource in one PUCCH communication resource, or a PUCCH communication resource in a plurality of PUCCH communication resources, and is included in a one-to-many relationship), PUCCH spatial info may be configured as {CSI-RS resource #x and CSI-RS resource #y}, that is, in a configuration in this example, the UE has two possible transmit beams (a transmit beam corresponding to a receive beam of a CSI-RS #x indicated by the CSI-RS resource #x, and a transmit beam corresponding to a receive beam of a CSI-RS #y indicated by the CSI-RS resource #y). In this embodiment, there is one PUCCH communication resource. In this case, if the UE sends a PUCCH on the dedicated communication resource by using one of the two beams, the access node cannot distinguish between the beams based on different communication resources. Therefore, the access node needs to receive the PUCCH on the dedicated PUCCH communication resource, and determine a beam that is specifically used by the UE, thereby ensuring that the access node can receive, in a correct direction, the PUCCH sent by the UE. Therefore, a use time of a beam may be related to the periodicity of the PUCCH. For example, assuming that the periodicity of the PUCCH is four slots (slot), it is agreed that the UE can use, when slot number mod (2*4)=0, only the CSI-RS resource #x to send the PUCCH used for a beam failure recovery request, and use, when slot number mod (2*4)=4, only the CSI-RS resource #y to send the PUCCH used for the beam failure recovery request. In addition, correspondingly, the access node needs to receive, when slot number mod (2*4)=0, the PUCCH by using the receive beam corresponding to the CSI-RS resource #x, and receive, when slot number mod (2*4)=4, the PUCCH by using the receive beam corresponding to the CSI-RS resource #y. Alternatively, in other words, if the base station can receive, when slot number mod (2*4)=0, the PUCCH by using the receive beam corresponding to the CSI-RS resource #x, it may be determined that an available beam fed back by the UE is the CSI-RS resource #x. It may be concluded that, if the periodicity of the PUCCH is P, and a quantity of reference signals of candidate beams is N, the UE should send, when slot number mod (P*N)=(n−1)*P, the PUCCH by using a transmit beam corresponding to an $n^{th}$ beam in a candidate beam set. In addition, the access node should also perform receiving in a corresponding slot by using a receive beam corresponding to the $n^{th}$ beam in the candidate beam set. The $n^{th}$ beam in the candidate beam set may be one of beams sorted based on values of identifiers of reference signals corresponding to the beams. The foregoing is merely an example in which a use time of each transmit beam of the PUCCH is related to periodicity of the PUCCH. This application is not limited thereto. Use of each transmit beam of the PUCCH may be alternatively defined in another form, to distinguish between beams. For another example, in an implementation, a use time of a beam may be related to the time offset (offset) of the PUCCH. Assuming that the periodicity of the PUCCH is four slots, it is agreed that the UE can use, when the offset is 0, only the CSI-RS resource #x to send the PUCCH used for the beam failure recovery request, or use, when the offset is 1, only the CSI-RS resource #y to send the PUCCH used for the beam failure recovery request. In addition, correspondingly, a base station needs to receive, when slot number mod (2*4)=0, the PUCCH by using the receive beam corresponding to the CSI-RS resource #x, and receive, when slot number mod (2*4)=4, the PUCCH by using the receive beam corresponding to the CSI-RS resource #y. In other words, if the base station can receive, when slot number mod (2*4)=0, the PUCCH by using the receive beam corresponding to the CSI-RS resource #x, it may be determined that an available beam fed back by the UE is the CSI-RS resource #x. It should be noted that using different offsets to distinguish between different beams may also be applicable to Embodiment 1.

When a PUCCH communication resource is associated with an uplink signal, a transmit beam of the PUCCH may be associated with a resource of the uplink signal (for example, an SRS corresponding to a trained beam). Optionally, based on a manner similar to the foregoing manner of associating a downlink signal resource (CSI-RS resource), a transmit beam of the uplink signal may be used as the transmit beam of the PUCCH, and different transmit beams of the PUCCH are distinguished based on predetermined association relationships between use time periods of the beams and, for example, the periodicity of the PUCCH and the time offset of the PUCCH or in another manner. Optionally, the corresponding association relationships may not be configured to distinguish between the use time periods of the beams, but it is specified that the UE performs polling by using transmit beams of all configured uplink signal resources, and an order may be based on numbers of the uplink signal resources. Optionally, a transmit beam of the PUCCH may be limited to a beam corresponding to an SRS used for beam management.

S202. The UE detects a beam failure event and detects a new available beam.

A downlink control channel PDCCH is used as an example. The UE evaluates quality of the control channel by using an RS that meets a spatial quasi-co-location relationship with a DMRS of the PDCCH and that is in a set $\bar{q}_0$ used for beam failure detection that is configured by the access node. Specifically, the UE 200 estimates a block error rate (Block Error Rate, BLER for short) of the PDCCH (PDCCH-hypothetical-BLER) by using an RS that meets a condition. In a beam detection interval (which may correspond to a reporting periodicity), when hypothetical-BLERs of all downlink control channels that need to be detected are greater than a threshold (for example, may be 0.1), one beam failure instance is determined. The UE counts beam failure instances. When a quantity of times for which beam failure instances consecutively occur reaches a maximum value N configured by the access node, it may be determined that the beam failure event is detected. The UE detects a downlink signal corresponding to a beam in the candidate beam set to determine the new available beam. A specific method for detecting a beam failure by the UE is not limited in this embodiment. For example, in this embodiment, it is assumed that the UE determines that a downlink beam represented by the CSI-RS resource #x meets a communication condition, and the downlink beam becomes a new available beam.

S203. When detecting the beam failure event, the UE sends a beam failure recovery request to the access node based on the resource configuration of the PUCCH and a corresponding periodicity of the PUCCH.

The PUCCH in this embodiment needs to have a periodic characteristic. Particularly, on a base station side, a receive beam corresponding to a PUCCH communication resource needs to be periodically used to receive a PUCCH message that may be sent by the UE and that is used for a beam recovery request. However, on a UE side, the PUCCH is sent based on the periodicity of the PUCCH, only when a beam failure event occurs and a new available beam of the PUCCH is determined. Optionally, the periodicity of the PUCCH may be configured by the access node, and optionally, the periodicity of the PUCCH may also be a preset periodicity, for example, a periodicity given in various types of protocols and specifications. Further, optionally, the periodicity may be related to a periodicity of an associated downlink signal resource or an uplink signal resource, or may be related to a reporting periodicity corresponding to a downlink signal. It should be noted that, if transmit beams of the PUCCH are distinguished by using association relationships between the transmit beams and the periodicity of the PUCCH, a transmit beam failure recovery request needs to be sent based on an association relationship between a transmit beam of the PUCCH and the periodicity.

Using an example in which the transmit beam of the PUCCH is associated with a resource of a CSI-RS in downlink signals, based on the CSI-RS resource #x discovered in 202 and the dedicated PUCCH communication resource configured in 201, the UE sends, on a PUCCH resource #x by using a transmit beam corresponding to a receive beam of the CSI-RS resource #x, the PUCCH used for the beam failure recovery request, to notify the access node of information about the beam failure and/or the new available beam. According to the configuration of the access node in 201, the access node can receive the PUCCH resource #x on the receive beam corresponding to the transmit beam for sending the CSI-RS resource #x. Optionally, according to a configuration of the access node or a predefinition, a PUCCH that is fed back by the UE may not include valid information (payload), and the base station can determine, by using an association relationship between the PUCCH resource #x and the CSI-RS resource #x, that an available beam fed back by the UE is the CSI-RS resource #x. Optionally, according to a configuration of a base station or a predefinition, a PUCCH fed back by the UE may include valid information, and the valid information indicates that a new available beam selected by the UE is the CSI-RS resource #x. In addition, the UE may further feed back beam quality corresponding to the CSI-RS resource #x, for example, L1-RSRP measured by using the CSI-RS resource #x. If the transmit beam of the PUCCH is configured as a transmit beam of an uplink signal, in this example, the transmit beam of the uplink signal is used on the dedicated communication resource to send the beam failure recovery request to the access node, and related information of the new available beam selected by the UE may be further indicated.

It should be noted that, when the PUCCH transmit beam configured in S201 is a beam for transmitting an uplink signal, the UE further sends beam information to the access node when the UE uses a transmit beam other than the transmit beam in beams for transmitting uplink signals to send the beam failure recovery request to the access node, where the beam information is used to indicate the beam for sending the beam failure recovery request.

S204. The access node sends a transmit beam failure recovery response message to the UE.

The UE needs to detect a response of the access node. After the access node receives the beam failure information and the information about the new available beam that are reported by the UE by using the PUCCH, the access node may send the response to the UE by using the available beam, so that the UE determines that the beam failure information and the new beam information are successfully received by the access node. In addition, subsequent communication may be performed based on the new beam reported by the UE. The response may be a PDCCH, or the response may be a PDCCH and a PDSCH is scheduled. Optionally, the UE receives the response of the access node by using the receive beam corresponding to the beam sending the PUCCH used for the beam failure recovery request in 103.

It should be noted that the access node does not necessarily send a response to the UE. In other words, the UE does not necessarily receive a response from the access node after sending the beam failure recovery request. If the UE does not receive a response within a predetermined time, it is considered that the beam failure recovery request fails. Optionally, the beam failure recovery request may be sent for a plurality of times within the predetermined time.

According to the resource configuration method in this embodiment of this application, the dedicate PUCCH resource used for beam failure recovery is configured, so that the UE can flexibly and effectively perform beam failure recovery, thereby reducing resource occupation and overheads.

Embodiment 3

Figure 5:
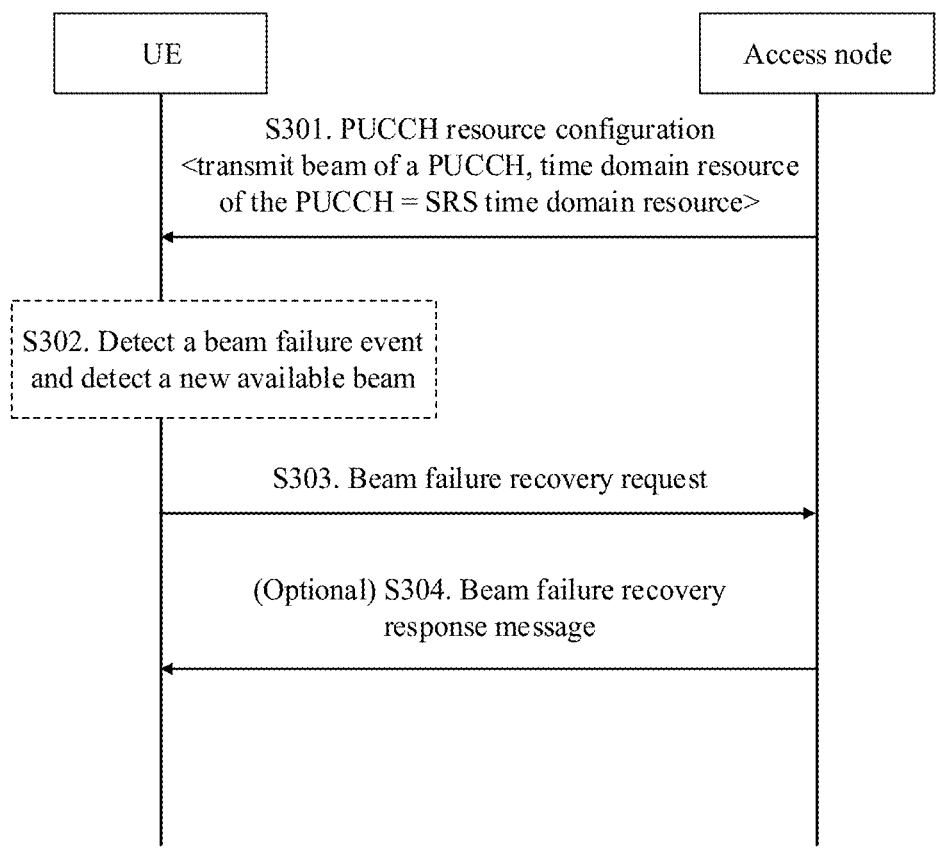
FIG. 5 is a flowchart of a third embodiment of a resource configuration method according to this application.

FIG. 5 is a flowchart of a third embodiment of a resource configuration method according to this application. A difference from Embodiment 1 and Embodiment 2 lies in that, in this embodiment, an existing uplink measurement signal resource is used to send a PUCCH used for a beam failure recovery request. Content that is the same as or similar to that in Embodiment 1 and Embodiment 2 is not described again in this embodiment. It should be noted that, for ease of understanding of the solution, in this embodiment, actions on both sides of UE and an access node are described, and an overall description is provided from perspectives of a plurality of parties of interaction. However, an improvement in a system is not limited to that steps on all sides of interaction need to be performed together. In the technical solution provided in this application, improvements are made on each side of the system.

The method includes the following steps.

S301. The access node sends a resource configuration of a physical uplink control channel PUCCH used for beam failure recovery to the UE, where the resource configuration of the PUCCH includes a corresponding transmit beam of the PUCCH, and a time domain resource of the PUCCH is the same as a time domain resource of an uplink measurement signal.

It should be noted that "same" includes "totally same" or "partially same". "Totally same" may mean that, for example, the 14$^{th}$ symbol in one slot may be used to send an SRS, and the 14$^{th}$ symbol in the slot may be used to send a PUCCH. "Partially same" may mean that, for example, the 14$^{th}$ symbol in one slot may be used to send an SRS, and the 11$^{th}$ symbol to the 14$^{th}$ symbol in the slot may be used to send a PUCCH.

Figure 6:
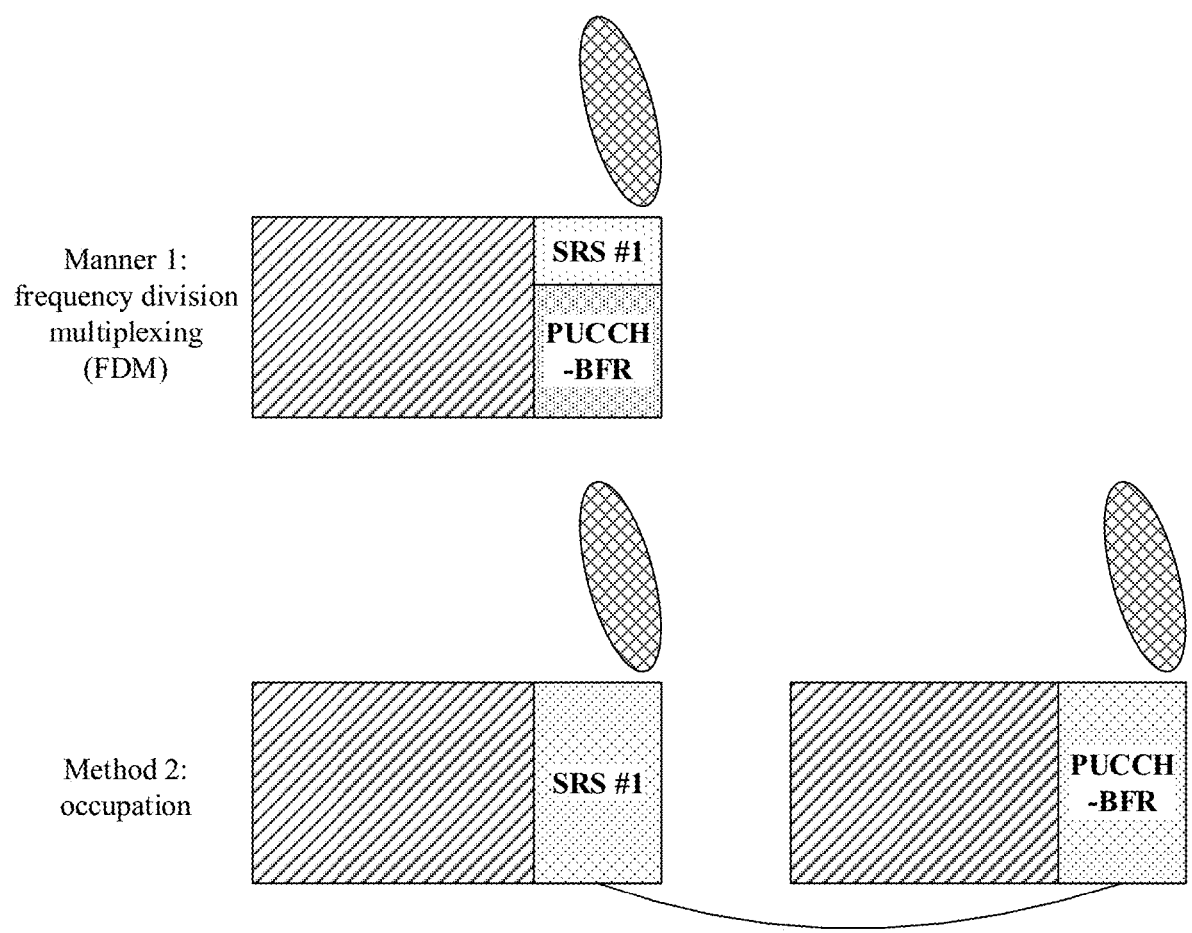
FIG. 6 is a schematic diagram of reusing a resource of an uplink measurement signal as a resource of a PUCCH according to this application.

In Embodiment 1 and Embodiment 2, the access node needs to periodically switch a receive beam of the access node to receive a beam failure recovery request that may be sent by the UE. In practice, because a beam failure of the UE is not a frequent event, the access node does not receive any valid information after specially switching a receive beam in most cases. This causes a loss to uplink system performance. Considering that the access node configures a periodic resource of an uplink measurement signal (such as an SRS) for the UE, using the SRS as an example, the access node originally receives the SRS on the resource of the SRS, and in particular, on an OFDM symbol. In this embodiment, the OFDM symbol is considered to be reused as a PUCCH resource. An SRS is used as an example of an uplink measurement signal. FIG. 6 is a schematic diagram of reusing a resource of an uplink measurement signal as a resource of a PUCCH. It can be learned that in a manner 1, a PUCCH (PUCCH-BFR) used for beam failure recovery (beam failure recovery, BFR for short) is configured to be frequency division multiplexed (frequency division multiplexing, FDM for short) with an uplink measurement signal (SRS #1), and in a manner 2, a PUCCH (PUCCH-BFR) configured for a beam failure recovery request may be configured to occupy a resource of an uplink measurement signal (SRS #1). To be specific, in the manner 1, a time domain resource in the resource configuration of the PUCCH is the same as a time domain resource of the uplink measurement signal, and a frequency domain resource in the resource configuration of the PUCCH is different from a frequency domain resource of the uplink measurement signal; and in the manner 2, a time-frequency resource in the resource configuration of the PUCCH is the same as a time-frequency resource of an uplink measurement signal.

Figure 7:
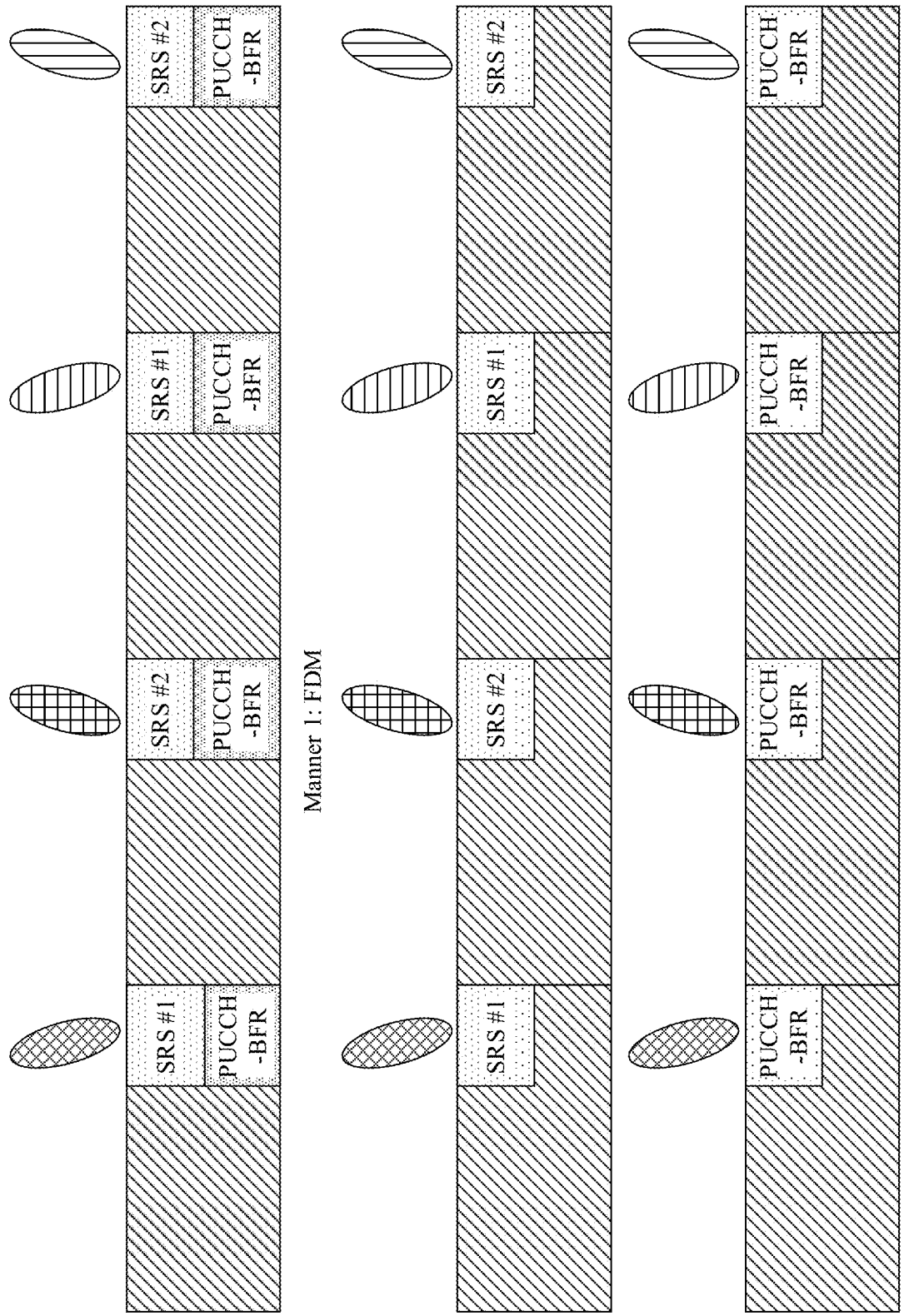
FIG. 7 is a schematic diagram of a PUCCH transmit beam in a scenario in which a resource of an uplink measurement signal is reused as a resource of a PUCCH according to this application.

For example, similar to that in Embodiment 1, reference signals of candidate beams are {CSI-RS resource #x and CSI-RS resource #y}. The PUCCH resource configured in this embodiment is frequency division multiplexed with one or more resources of an SRS, or occupies one or more resources of an SRS. A transmit beam of the PUCCH is consistent with one or more resources of an SRS that are frequency division multiplexed with/occupied by the PUCCH. An SRS is used as an example of an uplink measurement signal. FIG. 7 is a schematic diagram of a transmit beam of a PUCCH in a scenario in which a resource of an uplink measurement signal is reused as a PUCCH resource. In FIG. 7, the transmit beam of the PUCCH is consistent with an SRS transmit beam corresponding to one or more resources of an SRS that are multiplexed with/occupied by the PUCCH. FIG. 7 is merely an example. The transmit beam of the PUCCH is not necessarily consistent with the SRS transmit beam. Optionally, the transmit beam of the PUCCH may include an uplink transmit beam corresponding to a candidate beam that is in a candidate beam set and that is used to transmit a downlink signal.

It should be noted that when a time-frequency resource of the PUCCH resource is the same as a time-frequency resource of the uplink measurement signal, transmission of the PUCCH does not necessarily preferentially preempt the resource for transmission of the uplink measurement signal. Whether transmission of the PUCCH preempts the resource for transmission of the uplink measurement signal may be determined based on a priority configured by the access node or a predefined priority.

S302. The UE detects a beam failure event and detects a new available beam.

This embodiment is similar to Embodiment 1 and Embodiment 2, and details are not described herein again. For details, refer to the descriptions in Embodiment 1 and Embodiment 2.

S303. When detecting the beam failure event, the UE sends a beam failure recovery request to the access node based on the resource configuration of the PUCCH and a corresponding periodicity of the PUCCH.

It is assumed that the new available beam detected by the UE in S302 is the CSI-RS resource #x. The UE sends a beam failure recovery request based on the CSI-RS resource #x, the PUCCH resource that is configured in 301 and that is frequency division multiplexed with the uplink measurement signal resource/occupies the uplink measurement signal resource, and a transmit beam of the corresponding uplink measurement signal (where optionally, the transmit beam of the PUCCH is not necessarily the transmit beam of the uplink measurement signal, and may further include an uplink transmit beam corresponding to a candidate beam that is in the candidate beam set and that is used for transmitting a downlink signal), and notifies the access node of a beam failure and/or information about the new available beam. Alternatively, according to a configuration of the access node or a predefinition, a PUCCH fed back by the UE may include valid information, and the valid information indicates that a new available beam selected by the UE is the CSI-RS resource #x. In addition, the UE may further feed back beam quality corresponding to the CSI-RS resource #x, for example, L1-RSRP measured by using the CSI-RS resource #x.

It should be noted that, in a case in which transmission of the PUCCH needs to occupy a resource for transmission of an uplink measurement signal, if a priority of transmission of the uplink measurement signal is higher than that of transmission of the PUCCH, when the UE detects a beam failure event, and is ready to transmit the PUCCH based on the resource configuration of the PUCCH and a corresponding periodicity of the PUCCH, if there is exactly an uplink measurement signal to be transmitted, the UE does not send a beam failure recovery request to the access node, and waits for a next appropriate opportunity to transmit the PUCCH.

S304. The access node sends a transmit beam failure recovery response message to the UE.

The UE needs to detect a response of the access node. After the access node receives the beam failure information and/or the information about the new available beam that are reported by the UE by using the PUCCH, the access node may send the response to the UE by using the available beam, so that the UE determines that the beam failure information and the new beam information are successfully received by the access node. In addition, subsequent communication may be performed based on the new beam reported by the UE. The response may be a PDCCH, or the response may be a PDCCH and a PDSCH is scheduled. The UE should receive the response from this access node using the receive beam of the new available beam CSI-RS resource #x selected in 302.

It should be noted that the access node does not necessarily send a response to the UE. In other words, the UE does not necessarily receive a response from the access node after sending the beam failure recovery request. If the UE does not receive a response within a predetermined time, it is considered that the beam failure recovery request fails. Optionally, the beam failure recovery request may be sent for a plurality of times within the predetermined time.

According to the resource configuration method in this embodiment of this application, a configuration manner in which all or some of resources of uplink measurement signals are reused as PUCCH resources used for beam failure recovery is used, so that the UE can flexibly and effectively perform beam failure recovery, thereby reducing complexity and overheads.

Figure 8:
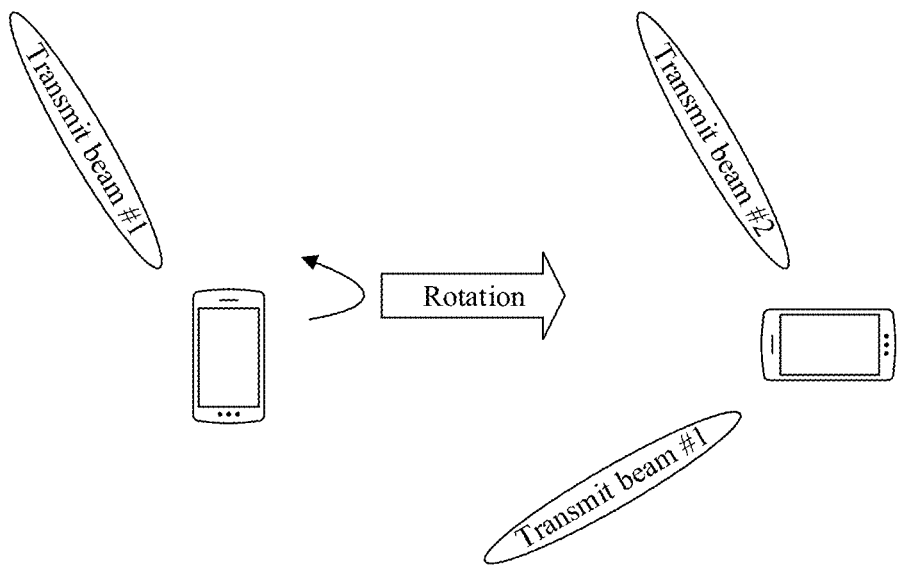
FIG. 8 is a schematic diagram of PUCCH transmit beam adjustment in a UE rotation scenario according to this application.

Further, optionally, for the foregoing three embodiments, when the transmit beam that is of the PUCCH and that is configured by the access node includes the transmit beam of the uplink measurement signal, a problem that the transmit beam changes due to rotation of the UE is considered, and an SRS is used as an example of the uplink measurement signal. FIG. 8 is a schematic diagram of PUCCH transmit beam adjustment in a UE rotation scenario. If UE sends an SRS based on an SRS transmit beam indication configured by an access node, the following table is provided.

| SRS resource #1 | Transmit beam #1 |
| SRS resource #2 | Transmit beam #2 |

In addition, a PUCCH is sent based on a transmit beam that is of the PUCCH and that is configured by a base station. The transmit beam of the PUCCH is consistent with a transmit beam corresponding to the SRS resource #1. To be specific, the following table is provided.

| PUCCH resource | PUCCH spatial info |
| --- | --- |
| PUCCH resource #1 | SRS resource #1 |

After the UE is rotated, as shown in FIG. 8, a direction of the transmit beam #1 corresponding to the SRS resource #1 changes. Consequently, the access node cannot receive a PUCCH transmission used for beam failure recovery. Based on an internal adjustment of the UE, the UE should send the PUCCH transmission by using the transmit beam #2 corresponding to the SRS resource #2. In other words, the UE autonomously rewrites a transmit beam indication of the PUCCH, where the information needs to be notified by the UE to the access node. For example, uplink beam information used after adjustment for the PUCCH is carried in an uplink message. According to this example, it should be further noted that, based on the technical solutions provided in the foregoing three embodiments, when detecting a beam failure event, the terminal device sends a beam failure recovery request based on a resource configuration of the PUCCH and a corresponding periodicity of the PUCCH. The based on a resource configuration of the PUCCH may include the following two cases: All PUCCH resources configured by the network device are used to perform beam failure recovery; or some PUCCH resources configured by the network device or no PUCCH resource configured by the network device are/is used to perform beam failure recovery. In other words, this is determined by the terminal device.

It can be understood that the periodicity of the PUCCH in all the foregoing embodiments may be configured by the network device. In other words, the resource configuration of the PUCCH includes the periodicity of the PUCCH, or the periodicity of the PUCCH may be a preset periodicity, that is, the periodicity of the PUCCH is predefined in a protocol, a specification, or the like. It should be noted that, if a base station configures uplink transmission or an uplink transmission resource with a periodicity property, for example, transmission of a periodic or semi-persistent uplink sounding signal, transmission of a periodic or semi-persistent scheduling request, transmission of periodic or semi-persistent data, reporting of a periodic or semi-persistent downlink reference signal, or a periodic or semi-persistent random access resource, some or all of periodicities of the foregoing uplink transmission or a periodicity of the uplink transmission resource may also be reused as the periodicity of the PUCCH.

The foregoing embodiments mainly describe the solutions provided in the embodiments of this application from a perspective of interaction between entities in a system or a perspective of an internal implementation procedure of an entity. It may be understood that to implement the foregoing functions, the foregoing various entities include corresponding hardware structures and/or software modules for performing the various functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed on the UE and the access node based on the method examples. For example, various functional modules may be obtained through division based on the corresponding functions, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used. An example in which functional modules are obtained through division based on functions is used below for description.

Figure 9:
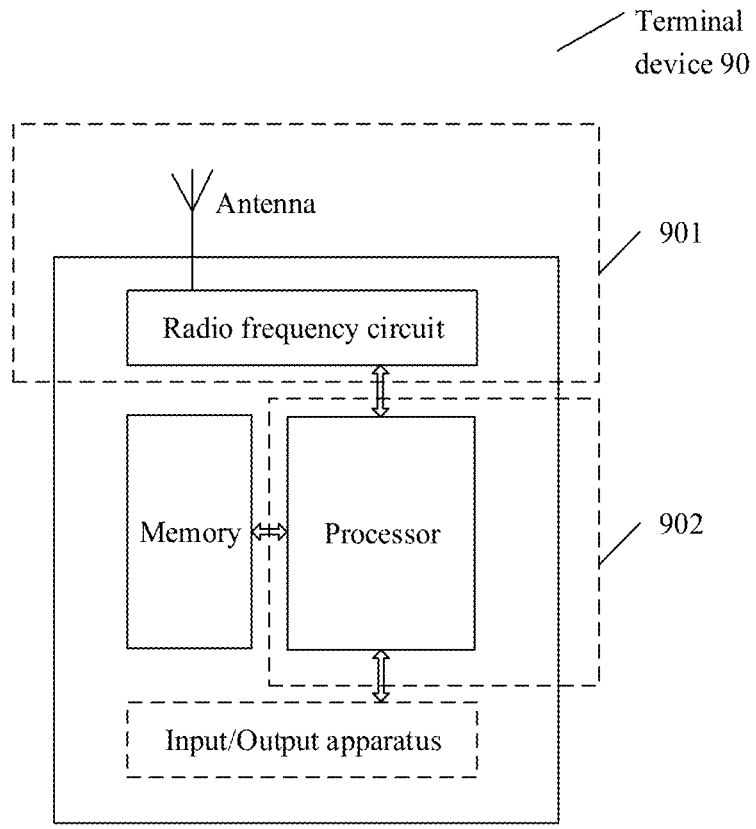
FIG. 9 is a simplified schematic structural diagram of a terminal device according to this application.

An embodiment of this application further provides a terminal device. The terminal device may be configured to perform the steps performed by the UE in any one of FIG. 2, FIG. 4, and FIG. 5. FIG. 9 is a simplified schematic structural diagram of a terminal device. For ease of understanding and convenience of figure illustration, an example in which the terminal device is a mobile phone is used in FIG. 9. As shown in FIG. 9, the terminal device 90 includes a processor, a memory, a radio frequency circuit, an antenna, and an input/output apparatus. The processor is mainly configured to: process a communication protocol and communication data, control the terminal device 90, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in an electromagnetic wave form. The input/output apparatus, such as a touchscreen, a display screen, or a keyboard, is mainly configured to receive data input by a user and output data to the user. It should be noted that some types of terminal devices 90 may not have an input/output apparatus. The memory and the processor may be integrated together or may be disposed independently. In addition, the radio frequency circuit and the processor may be integrated together or may be disposed independently.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal in an electromagnetic wave form by using the antenna. When data is sent to the terminal device 90, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 9 shows only one memory and processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device 90, and the processor having a processing function may be considered as a processing unit of the terminal device 90. As shown in FIG. 9, the terminal device 90 includes a transceiver unit 901 and a processing unit 902. The transceiver unit may also be referred to as a transceiver (including a transmitter and/or a receiver), a transceiver machine, a transceiver apparatus, a transceiver circuit, or the like. The processing unit may also be referred to as a processor, a processing board, a processing module, a processing apparatus, and the like. Optionally, a component for implementing a receiving function in the transceiver unit 901 may be considered as a receiving unit, and a component for implementing a sending function in the transceiver unit 901 may be considered as a sending unit. That is, the transceiver unit 901 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like. In some embodiments, the transceiver unit 901 and the processing unit 902 may be integrated together or may be disposed independently. In addition, all functions of the processing unit 902 may be integrated into one chip for implementation, or some functions of the processing unit 902 may be integrated into one chip for implementation and some other functions are integrated into one or more other chips for implementation. This is not limited in this application. The term "unit" used in this specification may refer to an application-specific integrated circuit (ASIC), an electronic circuit, a processor (shared, dedicated, or group) and memory, or a combinational logic circuit that executes one or more software or firmware programs, and/or other suitable components that provide the function.

For example, in an implementation, the transceiver unit 901 may be configured to perform the sending and/or receiving operations of the UE in S101, S103, and/or S104 in FIG. 2, and/or another step in this application. The processing unit 902 may be configured to perform S102 in FIG. 2 and/or another step in this application.

For example, in an implementation, the transceiver unit 901 may be configured to perform the sending and/or receiving operations of the UE in S201, S203, and/or S204 in FIG. 4, and/or another step in this application. The processing unit 902 may be configured to perform S202 in FIG. 4 and/or another step in this application.

For example, in an implementation, the transceiver unit 901 may be configured to perform the sending and/or receiving operations of the UE in S301, S303, and/or S304 in FIG. 5, and/or another step in this application. The processing unit 902 may be configured to perform S302 in FIG. 5 and/or another step in this application.

Figure 10:
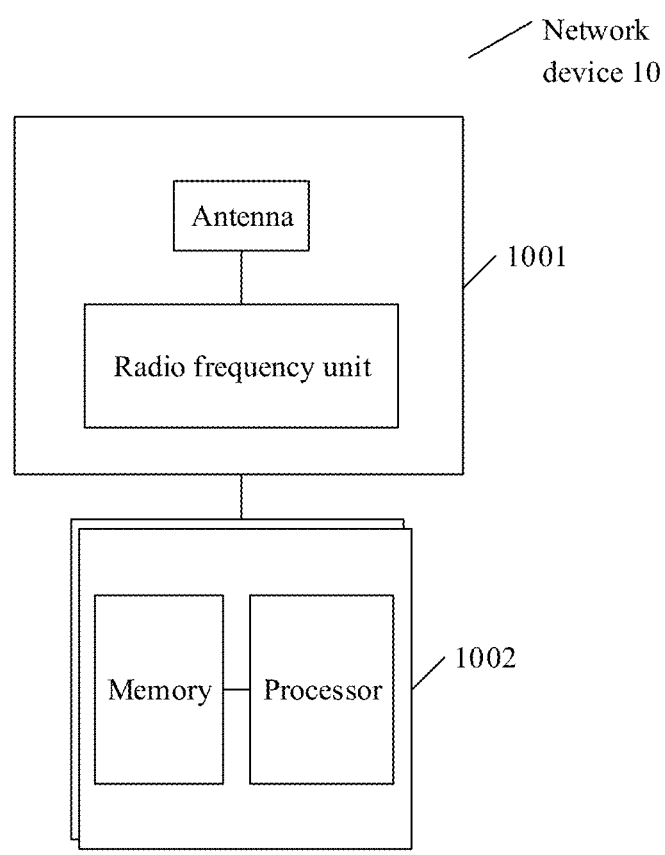
FIG. 10 is a simplified schematic structural diagram of a network device according to this application.

An embodiment of this application further provides a network device. The network device may be used as an access node or a transmission reception point, and is configured to perform the steps performed by the access node in any one of FIG. 2, FIG. 4, and FIG. 5. FIG. 10 is a simplified schematic structural diagram of a network device. The network device 100 includes a part 1001 and a part 1002. The part 1001 is mainly configured to send and receive a radio frequency signal and perform conversion between the radio frequency signal and a baseband signal. The part 1002 is mainly configured to perform baseband processing, control the network device 100, and the like. The part 1001 may be usually referred to as a transceiver unit, a transceiver machine, a transceiver circuit, a transceiver, or the like. The part 1002 is usually a control center of the network device 100, and may usually be referred to as a processing unit, a control unit, a processor, a controller, or the like, configured to control the network device 100 to perform the steps performed by an access side or by the access node/the transmission reception point on an access side in the foregoing related embodiments. For details, refer to the foregoing descriptions of the related parts.

A transceiver unit of the part 1001 may also be referred to as a transceiver machine, a transceiver, or the like. The transceiver unit includes an antenna and a radio frequency unit. The radio frequency unit is mainly configured to perform radio frequency processing. Optionally, a component for implementing a receiving function in the part 1001 may be considered as a receiving unit, and a component for implementing a sending function may be considered as a sending unit. That is, the part 1001 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 1002 may include one or more boards. Each board may include one or more processors and one or more memories. The processor is configured to read and execute a program in the memory to implement a baseband processing function and control the network device 100. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors. The memory and the processor may be integrated together or may be disposed independently. In some embodiments, the part 1001 and the part 1002 may be integrated together or may be disposed independently. In addition, all functions of the part 1002 may be integrated into one chip for implementation, or some functions of the part 1002 may be integrated into one chip for implementation and some other functions are integrated into one or more other chips for implementation. This is not limited in this application.

For example, in an implementation, the transceiver unit may be configured to perform the receiving and/or sending operations of the access node in S101, S103, and/or S104 in FIG. 2, and/or another step in this application. The processing unit may be configured to perform operations such as determining a resource configuration that is of a PUCCH and that is configured for UE, determining that a beam failure occurs on the UE, and determining a new available beam in the embodiment related to FIG. 2, and/or another step in this application.

For example, in an implementation, the transceiver unit may be configured to perform the receiving and/or sending operations of the access node in S201, S203, and/or S204 in FIG. 4, and/or another step in this application. The processing unit may be configured to perform operations such as determining a resource configuration that is of a PUCCH and that is configured for UE, determining that a beam failure occurs on the UE, and determining a new available beam in the embodiment related to FIG. 4, and/or another step in this application.

For example, in an implementation, the transceiver unit may be configured to perform the receiving and/or sending operations of the access node in S301, S303, and/or S304 in FIG. 5, and/or another step in this application. The processing unit may be configured to perform operations such as determining a resource configuration that is of a PUCCH and that is configured for UE, determining that a beam failure occurs on the UE, and determining a new available beam in the embodiment related to FIG. 5, and/or another step in this application.

The apparatus on the terminal side provided above may be a terminal device, or may be a chip or a functional module in a terminal device, and may implement the foregoing method by software or hardware, or by executing corresponding software by hardware.

A specific implementation of the apparatus on the network side provided above may be an access node device. For example, the apparatus may be an access node device, or may be a chip or a functional module in an access node device. The method may be implemented by software or hardware, or by executing corresponding software by hardware.

For explanations and beneficial effects of related content in any one of the foregoing provided terminal devices, network devices, and corresponding apparatuses, refer to the corresponding method embodiment provided above. Details are not described herein again This application further provides a beam failure detection system, including the UE (or a UE side apparatus implementing the foregoing UE function) and the access node (or an access side apparatus or a transmission reception point implementing the foregoing access node function) in the foregoing implementations.

This application further provides a computer program product. When the computer program product runs on a computer, the computer is enabled to perform any method provided above.

This application further provides a chip, where the chip stores an instruction, and when the instruction is run on the foregoing devices, the devices are enabled to perform the methods provided above.

This application further provides a computer storage medium. The computer storage medium stores a computer program (instruction). When the program (instruction) is run on a computer, the computer is enabled to perform the method according to any one of the foregoing aspects.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising (comprising)" does not exclude another component or another step, and "a" or "one" does not exclude a meaning of plurality. A single processor/controller or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clearly that various modifications and combinations may be made to them without departing from the scope of this application. Correspondingly, the specification and the accompanying drawings are merely example description of this application defined by the appended claims, and are considered as any of or all modifications, variations, combinations, or equivalents that cover the scope of this application. It is clearly that a person skilled in the art can make various modifications and variations to this application without departing from the spirit and scope of this application. In this way, this application is intended to cover these modifications and variations provided that these modifications and variations of this application fall within the scope of the claims and their equivalent technologies of this application.

What is claimed is:

1. A resource configuration method, wherein the method comprises:
   receiving, through a radio resource control (RRC) message, a resource configuration that is of a physical uplink control channel (PUCCH) used for beam failure recovery request and that is sent by a network device, wherein the resource configuration of the PUCCH comprises a periodicity of the PUCCH and an indication to use a particular transmit beam to transmit the PUCCH for beam failure recovery request; and
   when a beam failure event is detected, sending a beam failure recovery request to the network device based on the resource configuration of the PUCCH and a corresponding periodicity of the PUCCH.

2. The method according to claim 1, wherein the resource configuration of the PUCCH further comprises: an association relationship between a use time of the transmit beam and the periodicity of the PUCCH, or an association relationship between the use time of the transmit beam and a time offset of the PUCCH.

3. The method according to claim 1, wherein when a PUCCH resource used for the beam failure recovery request and a transmission of an uplink measurement signal are in a same time domain resource, the sending of the beam failure recovery request is preferential.

4. The method according to claim 3, wherein in a same time domain resource comprises: in a same symbol.

5. The method according to claim 3, wherein the uplink measurement signal is a sounding reference signal (SRS).

6. The method according to claim 1, wherein the resource configuration of the PUCCH further comprises at least one of the following: a communication resource of the PUCCH, a time offset of the PUCCH, or a format of the PUCCH.

7. The method according to claim 1, wherein
   the resource configuration of the PUCCH is associated with resources of downlink signals corresponding to candidate beams in a candidate beam set, and the candidate beam set is a beam set used for beam failure recovery and configured by the network device; or
   the resource configuration of the PUCCH is associated with one or more resources of one or more uplink signals.

8. The method according to claim 7, wherein
   the transmit beam comprises uplink transmit beams corresponding to the candidate beams that are in the candidate beam set and that are used to transmit the downlink signals; or
   the transmit beam comprises beams used to send the uplink signals.

9. A resource configuration apparatus, wherein the apparatus comprises at least one processor, wherein the at least one processor is configured to read an instruction in a memory and implement:
   causing a transceiver to receive, through a radio resource control (RRC) message, a resource configuration that is of a physical uplink control channel (PUCCH) used for beam failure recovery request and that is sent by a network device, wherein the resource configuration of the PUCCH comprises a periodicity of the PUCCH and an indication to use a particular transmit beam to transmit the PUCCH for beam failure recovery request, wherein
   when detecting a beam failure event, causing the transceiver to send a beam failure recovery request to the network device based on the resource configuration of the PUCCH and a corresponding periodicity of the PUCCH.

10. The apparatus according to claim 9, wherein the resource configuration of the PUCCH further comprises at least one of the following: a communication resource of the PUCCH, a time offset of the PUCCH, or a format of the PUCCH.

11. The apparatus according to claim 9, wherein the resource configuration of the PUCCH further comprises: an association relationship between a use time of the transmit beam and the periodicity of the PUCCH, or an association relationship between the use time of the transmit beam and a time offset of the PUCCH.

12. The apparatus according to claim 9, wherein when a PUCCH resource used for the beam failure recovery request and a transmission of an uplink measurement signal are in a same time domain resource, the sending of the beam failure recovery request is preferential.

13. The apparatus according to claim 12, wherein in a same time domain resource comprises: in a same symbol.

14. The apparatus according to claim 12, wherein the uplink measurement signal is a sounding reference signal (SRS).

15. The apparatus according to claim 9, wherein the apparatus is a terminal device or a chip.

16. The apparatus according to claim 9, wherein
   the resource configuration of the PUCCH is associated with resources of downlink signals corresponding to candidate beams in a candidate beam set, and the candidate beam set is a beam set used for beam failure recovery and configured by the network device; or
   the resource configuration of the PUCCH is associated with one or more resources of one or more uplink signals.

17. The apparatus according to claim 16, wherein
   the transmit beam comprises uplink transmit beams corresponding to the candidate beams that are in the candidate beam set and that are used to transmit the downlink signals; or
   the transmit beam comprises beams used to send the uplink signals.

18. A non-transitory computer-readable storage medium storing a computer program, wherein when the program is executed by a computer, implementing:
   receiving, through a radio resource control (RRC) message, a resource configuration that is of a physical uplink control channel (PUCCH) used for beam failure recovery request and that is sent by a network device, wherein the resource configuration of the PUCCH comprises a periodicity of the PUCCH and an indication to use a particular transmit beam to transmit the PUCCH for beam failure recovery request; and
   when a beam failure event is detected, sending a beam failure recovery request to the network device based on the resource configuration of the PUCCH and a corresponding periodicity of the PUCCH.

19. The medium according to claim 18, wherein when a PUCCH resource used for the beam failure recovery request and a transmission of an uplink measurement signal are in a same time domain resource, the sending of the beam failure recovery request is preferential.

20. The medium according to claim 19, wherein in a same time domain resource comprises: in a same symbol.

21. The medium according to claim 19, wherein the uplink measurement signal is a sounding reference signal (SRS).

22. The non-transitory computer-readable storage medium according to claim 18, wherein the resource configuration of the PUCCH further comprises at least one of the following: a communication resource of the PUCCH, a time offset of the PUCCH, or a format of the PUCCH.

23. The non-transitory computer-readable storage medium according to claim 18, wherein the resource configuration of the PUCCH further comprises: an association relationship between a use time of the transmit beam and the periodicity of the PUCCH, or an association relationship between the use time of the transmit beam and a time offset of the PUCCH.

24. The medium according to claim 18, wherein
the resource configuration of the PUCCH is associated with resources of downlink signals corresponding to candidate beams in a candidate beam set, and the candidate beam set is a beam set used for beam failure recovery and configured by the network device; or
the resource configuration of the PUCCH is associated with one or more resources of one or more uplink signals.

25. The medium according to claim 24, wherein
the transmit beam comprises uplink transmit beams corresponding to the candidate beams that are in the candidate beam set and that are used to transmit the downlink signals; or
the transmit beam comprises beams used to send the uplink signals.

\* \* \* \* \*